(12) United States Patent
Tanemura et al.

(10) Patent No.: US 9,640,202 B2
(45) Date of Patent: May 2, 2017

(54) METHOD OF MANUFACTURING PLASMON GENERATOR

(71) Applicants: Shigeki Tanemura, Milpitas, CA (US); Yoshitaka Sasaki, Santa Clara, CA (US); Hiroyuki Ito, Milpitas, CA (US); Yukinori Ikegawa, Milpitas, CA (US); Hironori Araki, Milpitas, CA (US); Seiichiro Tomita, Milpitas, CA (US)

(72) Inventors: Shigeki Tanemura, Milpitas, CA (US); Yoshitaka Sasaki, Santa Clara, CA (US); Hiroyuki Ito, Milpitas, CA (US); Yukinori Ikegawa, Milpitas, CA (US); Hironori Araki, Milpitas, CA (US); Seiichiro Tomita, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 1065 days.

(21) Appl. No.: 13/856,109

(22) Filed: Apr. 3, 2013

(65) Prior Publication Data

US 2014/0298644 A1 Oct. 9, 2014

(51) Int. Cl.
  *G11B 5/00* (2006.01)
  *G11B 5/31* (2006.01)
  *G11B 5/60* (2006.01)
  *G11B 5/84* (2006.01)

(52) U.S. Cl.
  CPC ............ *G11B 5/3163* (2013.01); *G11B 5/314* (2013.01); *G11B 5/6088* (2013.01); *G11B 5/84* (2013.01); *G11B 2005/0021* (2013.01); *Y10T 29/49032* (2015.01)

(58) Field of Classification Search
  CPC ..... G11B 5/314; G11B 5/6088; G11B 5/3163; G11B 2005/0021; G11N 2005/0021
  See application file for complete search history.

(56) References Cited

U.S. PATENT DOCUMENTS

| | | | |
|---|---|---|---|
| 8,675,457 B1* | 3/2014 | Hirata | G11B 5/314 369/13.33 |
| 8,848,495 B1* | 9/2014 | Wu | G11B 5/3133 369/13.33 |
| 2011/0170381 A1 | 7/2011 | Matsumoto | |
| 2011/0205863 A1* | 8/2011 | Zhao | B82Y 10/00 369/13.33 |

\* cited by examiner

*Primary Examiner* — Livius R Cazan
(74) *Attorney, Agent, or Firm* — Oliff PLC

(57) ABSTRACT

A method of manufacturing a plasmon generator includes the steps of: forming an initial film made of a metal polycrystal and including a pre-plasmon-generator portion that later becomes the plasmon generator; heating the initial film with heating light so that a plurality of crystal grains constituting the metal polycrystal grow at least in the pre-plasmon-generator portion; stopping the heating of the initial film; and forming the plasmon generator by processing the initial film after the step of stopping the heating. The step of forming the plasmon generator includes the step of providing the pre-plasmon-generator portion with a front end face that generates near-field light.

9 Claims, 20 Drawing Sheets

METHOD OF MANUFACTURING PLASMON GENERATOR

BACKGROUND OF THE INVENTION

1. Field of the Invention

The present invention relates to a method of manufacturing a plasmon generator for use in thermally-assisted magnetic recording where a recording medium is irradiated with near-field light to lower the coercivity of the recording medium for data writing.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium-facing surface of the slider.

The plasmon generator has a front end face located in the medium-facing surface. The front end face generates near-field light. Surface plasmons are excited on the plasmon generator and propagate along the surface of the plasmon generator to reach the front end face. As a result, the surface plasmons concentrate at the front end face, and near-field light is generated from the front end face based on the surface plasmons.

U.S. Patent Application Publication No. 2011/0170381 A1 discloses a technology in which the surface of a waveguide and the surface of a metallic structure (plasmon generator) are arranged to face each other with a gap therebetween, and evanescent light that occurs at the surface of the waveguide based on the light propagating through the waveguide is used to excite surface plasmons on the metallic structure, so that near-field light is generated based on the excited surface plasmons.

Part of the energy of light guided to the plasmon generator through the waveguide is transformed into heat in the plasmon generator. Part of the energy of near-field light generated by the plasmon generator is also transformed into heat in the plasmon generator. The plasmon generator thus increases in temperature during the operation of the thermally-assisted magnetic recording head. The plasmon generator is typically formed of a polycrystal of metal such as Au or Ag having a high electrical conductivity. An increase in the temperature of such a plasmon generator would cause a plurality of crystal grains constituting the metal polycrystal to aggregate and grow, and this may result in a deformation of the plasmon generator. The deformation of the plasmon generator takes place, for example, in a manner such that the front end face of the plasmon generator is significantly recessed relative to the other parts of the medium-facing surface. Such a deformation of the plasmon generator would cause the plasmon generator to be unable to provide the desired heating capability thereof. Thus, conventional plasmon generators have the drawback of being low in reliability.

OBJECT AND SUMMARY OF THE INVENTION

It is an object of the present invention to provide a method of manufacturing a plasmon generator that allows manufacture of a plasmon generator of high reliability, and to provide a method of manufacturing a plurality of thermally-assisted magnetic recording heads each having a plasmon generator of high reliability.

A plasmon generator manufactured by a manufacturing method of the present invention has a plasmon-exciting part configured to excite a surface plasmon, and a front end face that generates near-field light based on the surface plasmon. The manufacturing method for the plasmon generator of the present invention includes the steps of: forming an initial film made of a metal polycrystal and including a pre-plasmon-generator portion that later becomes the plasmon generator; heating the initial film with heating light so that a plurality of crystal grains constituting the metal polycrystal grow at least in the pre-plasmon-generator portion; stopping the heating of the initial film; and forming the plasmon generator by processing the initial film after the step of stopping the heating. The step of forming the plasmon generator includes the step of providing the pre-plasmon-generator portion with the front end face.

In the manufacturing method for the plasmon generator of the present invention, the initial film may be irradiated with the heating light in the step of heating the initial film.

The manufacturing method for the plasmon generator of the present invention may further include the step of forming an anti-reflection film on the initial film between the step of forming the initial film and the step of heating the initial film, the anti-reflection film being lower in reflectivity for the heating light than the initial film. In this case, the anti-reflection film may be irradiated with the heating light in the step of heating the initial film.

Each of a plurality of thermally-assisted magnetic recording heads manufactured by a manufacturing method of the present invention includes a substrate having a top surface, a write head section disposed above the top surface of the substrate, a read head section disposed between the top surface of the substrate and the write head section, and a medium-facing surface facing a recording medium. The write head section includes: a main pole that produces a write magnetic field for writing data on the recording medium; a waveguide including a core and a cladding, the core allowing light to propagate through; and a plasmon generator. The plasmon generator has a plasmon-exciting part configured to excite a surface plasmon based on the light propagating through the core, and a front end face located in the medium-facing surface and generating near-field light based on the surface plasmon.

The manufacturing method for the plurality of thermally-assisted magnetic recording heads of the present invention includes the steps of: fabricating a substructure including an array of a plurality of pre-head portions, the plurality of pre-head portions becoming the plurality of thermally-assisted magnetic recording heads later; and forming the plurality of thermally-assisted magnetic recording heads by cutting the substructure to separate the plurality of pre-head portions from each other and by forming the medium-facing surface for each of the plurality of pre-head portions. The step of fabricating the substructure includes the steps of: forming an initial film made of a metal polycrystal and including a plurality of pre-plasmon-generator portions that later become a plurality of plasmon generators corresponding to the plurality of thermally-assisted magnetic recording heads; heating the initial film with heating light so that a plurality of crystal grains constituting the metal polycrystal grow at least in the plurality of pre-plasmon-generator portions; and stopping the heating of the initial film. In the step of forming the plurality of thermally-assisted magnetic recording heads, each of the plurality of pre-plasmon-generator portions is provided with the front end face and the plurality of pre-plasmon-generator portions thereby become the plurality of plasmon generators.

In the manufacturing method for the plurality of thermally-assisted magnetic recording heads of the present invention, the initial film may be irradiated with the heating light in the step of heating the initial film.

In the manufacturing method for the plurality of thermally-assisted magnetic recording heads of the present invention, the step of fabricating the substructure may further include the step of forming an anti-reflection film on the initial film between the step of forming the initial film and the step of heating the initial film, the anti-reflection film being lower in reflectivity for the heating light than the initial film. In this case, the anti-reflection film may be irradiated with the heating light in the step of heating the initial film.

In the manufacturing method for the plurality of thermally-assisted magnetic recording heads of the present invention, the plurality of pre-plasmon-generator portions may be heated one by one or simultaneously in the step of heating the initial film.

In the manufacturing method for the plurality of thermally-assisted magnetic recording heads of the present invention, the core may have an evanescent-light-generating surface that generates evanescent light based on the light propagating through the core, and the cladding may have an interposition part interposed between the evanescent-light-generating surface and the plasmon-exciting part. The surface plasmon is excited on the plasmon-exciting part through coupling with the evanescent light generated from the evanescent-light-generating.

In the manufacturing method for the plasmon generator and the manufacturing method for the plurality of thermally-assisted magnetic recording heads of the present invention, before the front end face of the plasmon generator is provided, the initial film is heated with the heating light so that a plurality of crystal grains constituting the metal polycrystal grow at least in the pre-plasmon-generator portion. This prevents the growth of the plurality of crystal grains and the resulting deformation of the plasmon generator when the plasmon generator is in use. The present invention thus makes it possible to manufacture a plasmon generator of high reliability and a plurality of thermally-assisted magnetic recording heads each having a plasmon generator of high reliability.

Other and further objects, features and advantages of the present invention will appear more fully from the following description.

DETAILED DESCRIPTION OF THE PREFERRED EMBODIMENTS

First Embodiment

Figure 2:
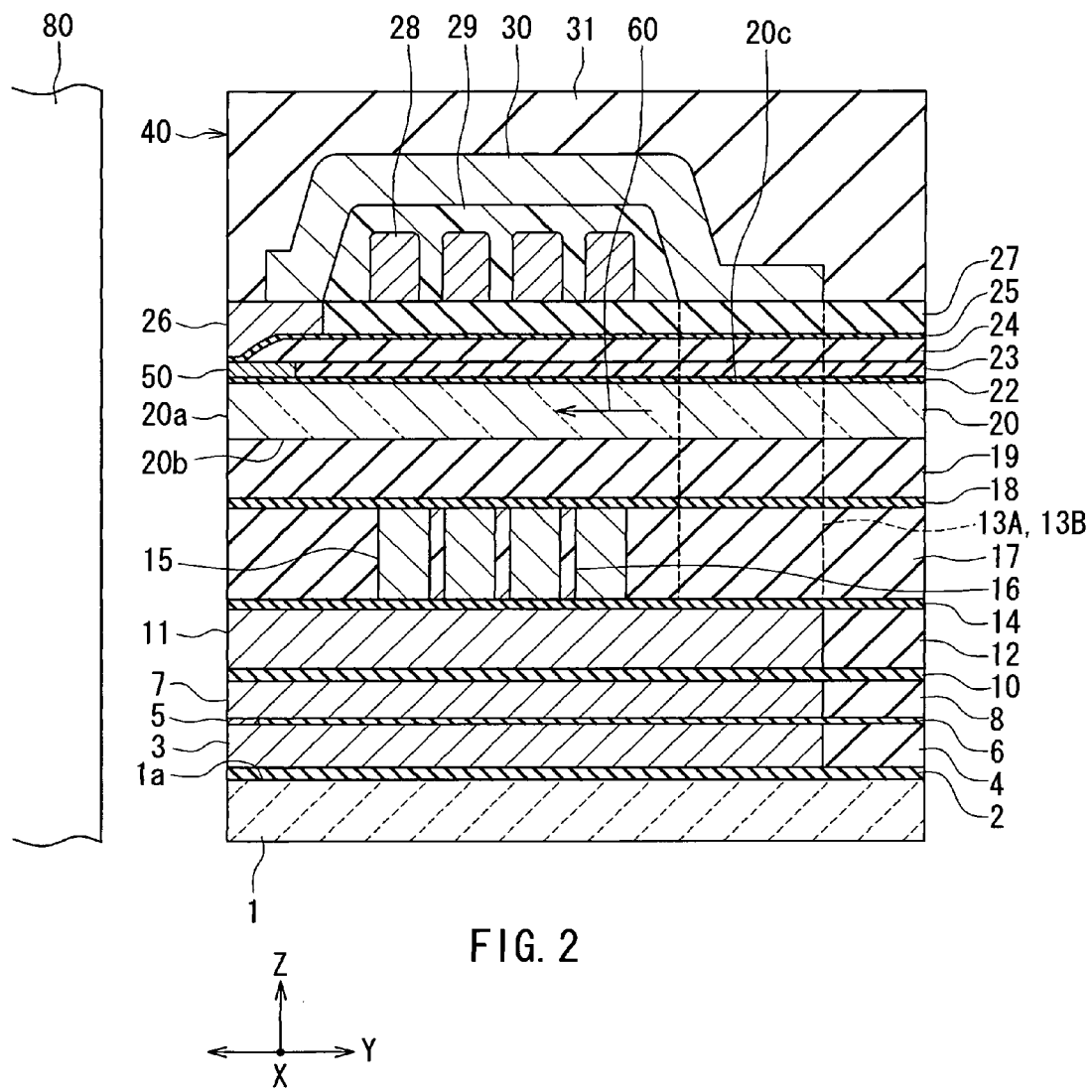
FIG. 2 is a cross-sectional view showing the configuration of the thermally-assisted magnetic recording head according to the first embodiment of the invention.
Figure 3:
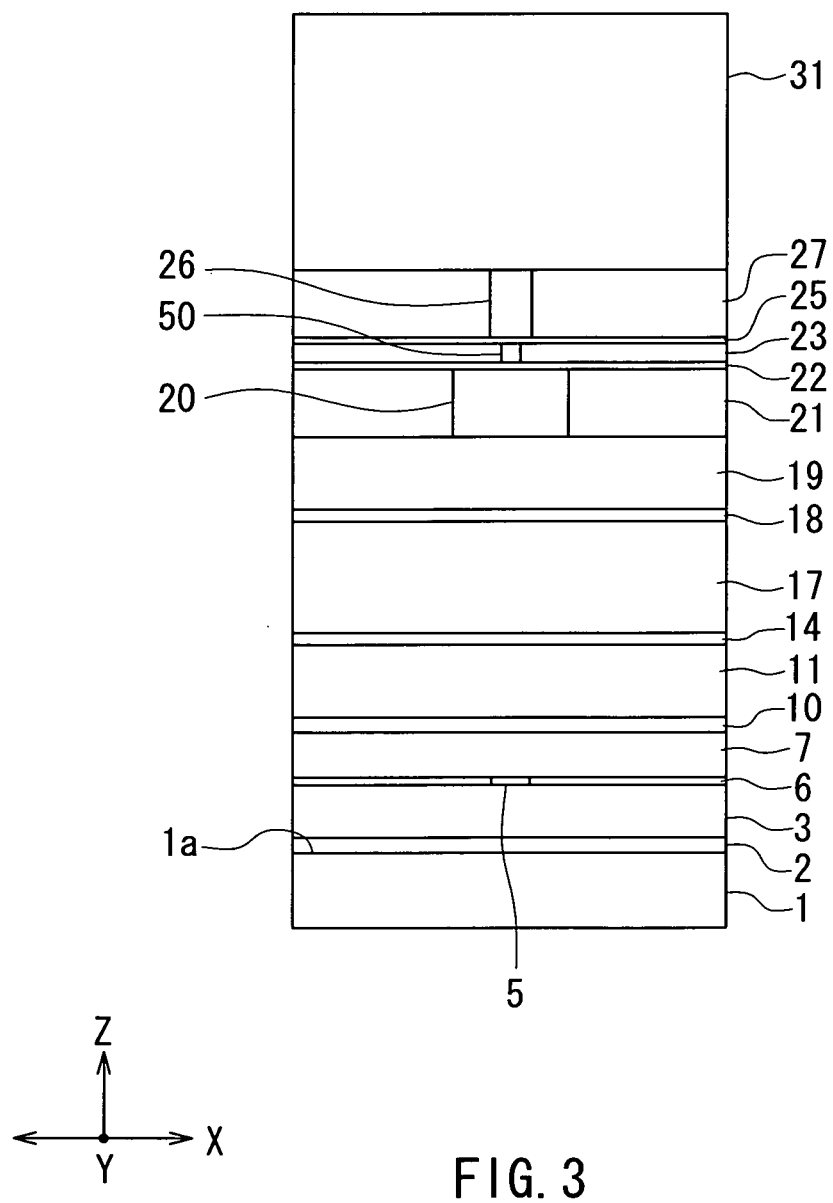
FIG. 3 is a front view showing the medium-facing surface of the thermally-assisted magnetic recording head according to the first embodiment of the invention.

Preferred embodiments of the present invention will now be described in detail with reference to the drawings. First, reference is made to FIG. 2 and FIG. 3 to describe the configuration of a thermally-assisted magnetic recording head according to a first embodiment of the invention. FIG. 2 is a cross-sectional view showing the configuration of the thermally-assisted magnetic recording head. FIG. 3 is a front view showing the medium-facing surface of the thermally-assisted magnetic recording head.

The thermally-assisted magnetic recording head according to the present embodiment is for use in perpendicular magnetic recording, and is in the form of a slider to fly over the surface of a rotating recording medium. When the recording medium rotates, an airflow passing between the recording medium and the slider causes a lift to be exerted on the slider. The slider is configured to fly over the surface of the recording medium by means of the lift.

As shown in FIG. 2, the thermally-assisted magnetic recording head has a medium-facing surface 40 facing a recording medium 80. Here, X direction, Y direction, and Z direction will be defined as follows. The X direction is the direction across the tracks of the recording medium 80, i.e., the track width direction. The Y direction is a direction perpendicular to the medium-facing surface 40. The Z direction is the direction of travel of the recording medium 80 as viewed from the slider. The X, Y, and Z directions are orthogonal to one another.

As shown in FIG. 2 and FIG. 3, the thermally-assisted magnetic recording head includes: a substrate 1 formed of a ceramic material such as aluminum oxide-titanium carbide ($Al_2O_3$—TiC) and having a top surface 1a; an insulating layer 2 formed of an insulating material and disposed on the top surface 1a of the substrate 1; a bottom shield layer 3 formed of a magnetic material and disposed on the insulating layer 2; and an insulating layer 4 disposed on the insulating layer 2 and surrounding the bottom shield layer 3. The insulating layers 2 and 4 are formed of alumina ($Al_2O_3$), for example. The Z direction is also a direction perpendicular to the top surface 1a of the substrate 1.

The thermally-assisted magnetic recording head further includes: a magnetoresistive (MR) element 5 serving as a read element disposed on the bottom shield layer 3; an insulating layer 6 disposed on the bottom shield layer 3 and the insulating layer 4 and surrounding the MR element 5; a top shield layer 7 formed of a magnetic material and disposed on the MR element 5 and the insulating layer 6; and an insulating layer 8 disposed on the insulating layer 6 and surrounding the top shield layer 7. The insulating layers 6 and 8 are formed of alumina, for example. The parts from the bottom shield layer 3 to the top shield layer 7 constitute a read head section.

An end of the MR element 5 is located in the medium-facing surface 40. The MR element 5 may be an element formed of a magneto-sensitive film that exhibits a magnetoresistive effect, such as a giant magnetoresistive (GMR) element or a tunneling magnetoresistive (TMR) element. GMR elements and TMR elements each typically include a free layer, a pinned layer, a spacer layer located between the free layer and the pinned layer, and an antiferromagnetic layer located on a side of the pinned layer farther from the spacer layer. The free layer is a ferromagnetic layer whose magnetization direction varies in response to a signal magnetic field. The pinned layer is a ferromagnetic layer whose magnetization direction is pinned. The antiferromagnetic layer is to pin the magnetization direction of the pinned layer by means of exchange coupling with the pinned layer. For GMR elements, the spacer layer is a nonmagnetic conductive layer. For TMR elements, the spacer layer is a tunnel barrier layer.

The GMR element may be of either the current-in-plane (CIP) type in which a current used for detecting magnetic signals is fed in a direction generally parallel to the planes of layers constituting the GMR element or the current-perpendicular-to-plane (CPP) type in which the current used for detecting magnetic signals is fed in a direction generally perpendicular to the planes of layers constituting the GMR element. Where the MR element 5 is a TMR element or a CPP-type GMR element, the bottom shield layer 3 and the top shield layer 7 may also serve as electrodes for feeding a sense current to the MR element 5. Where the MR element 5 is a CIP-type GMR element, insulating films are respectively provided between the MR element 5 and the bottom shield layer 3 and between the MR element 5 and the top shield layer 7, and two leads are provided between these insulating films in order to feed the sense current to the MR element 5.

The thermally-assisted magnetic recording head further includes a nonmagnetic layer 10 formed of a nonmagnetic material and disposed on the top shield layer 7 and the insulating layer 8, a return pole layer 11 formed of a magnetic material and disposed on the nonmagnetic layer 10, and an insulating layer 12 disposed on the nonmagnetic layer 10 and surrounding the return pole layer 11. The return pole layer 11 has an end face located in the medium-facing surface 40. The nonmagnetic layer 10 and the insulating layer 12 are formed of alumina, for example.

The thermally-assisted magnetic recording head further includes two coupling portions 13A and 13B disposed away from the medium-facing surface 40 and lying on a part of the return pole layer 11, an insulating layer 14 disposed on another part of the return pole layer 11 and on the insulating layer 12, and a coil 15 disposed on the insulating layer 14. The coupling portions 13A and 13B are formed of a magnetic material. Each of the coupling portions 13A and 13B has a first layer located on the return pole layer 11, and a second, a third, and a fourth layer stacked in this order on the first layer. The first layer of the coupling portion 13A and the first layer of the coupling portion 13B are arranged to align in the track width direction (the X direction). The coil 15 is planar spiral-shaped and wound around the first layers of the coupling portions 13A and 13B. The coil 15 is formed of a conductive material such as copper. The insulating layer 14 is formed of alumina, for example.

The thermally-assisted magnetic recording head further includes an insulating layer 16 disposed in the space between every adjacent turns of the coil 15, an insulating layer 17 disposed around the coil 15, and an insulating layer 18 disposed on the coil 15 and the insulating layers 16 and 17. The insulating layer 16 is formed of photoresist, for example. The insulating layers 17 and 18 are formed of alumina, for example. The first layers of the coupling portions 13A and 13B are embedded in the insulating layers 14 and 17.

The thermally-assisted magnetic recording head further includes a waveguide including a core 20 and a cladding provided around the core 20. The core 20 has an end face 20a closer to the medium facing surface 40, a bottom surface 20b, an evanescent-light-generating surface 20c or a top surface, and two side surfaces connecting the bottom surface 20b and the evanescent-light-generating surface 20c to each other. The end face 20a may be located in the medium-facing surface 40 or at a distance from the medium-facing surface 40. FIG. 2 and FIG. 3 illustrate an example in which the end face 20a is located in the medium-facing surface 40.

The cladding includes cladding layers 19, 21, and 22. The cladding layer 19 is disposed on the insulating layer 18. The core 20 is disposed on the cladding layer 19. The cladding layer 21 is disposed on the cladding layer 19 and surrounds the core 20. The evanescent-light-generating surface 20c of the core 20 and the top surface of the cladding layer 21 are even with each other. The cladding layer 22 is disposed over the evanescent-light-generating surface 20c and the top surface of the cladding layer 21.

The core 20 is formed of a dielectric material that transmits laser light to be used for generating near-field light. The laser light emitted from a laser diode (not illustrated) enters the core 20 and propagates through the core 20. The cladding layers 19, 21 and 22 are each formed of a dielectric material that has a refractive index lower than that of the core 20. For example, the core 20 can be formed of tantalum oxide such as $Ta_2O_5$, SiON, or niobium oxide. The cladding layers 19, 21 and 22 can be formed of alumina or $SiO_2$.

The second layers of the coupling portions 13A and 13B are embedded in the insulating layer 18 and the cladding layer 19. The third layers of the coupling portions 13A and 13B are embedded in the cladding layer 21. The third layer of the coupling portion 13A and the third layer of the coupling portion 13B are located on opposite sides of the core 20 in the track width direction (the X direction), each being at a distance from the core 20.

The thermally-assisted magnetic recording head further includes a plasmon generator 50. The plasmon generator 50 is disposed on the cladding layer 22 such that part of the cladding layer 22 is interposed between the plasmon generator 50 and the evanescent-light-generating surface 20c of the core 20. The plasmon generator 50 is formed of metal. More specifically, the plasmon generator 50 is formed of, for example, one of Au, Ag, Al, Cu, Pd, Pt, Rh and Ir, or an alloy composed of two or more of these elements. The shape of the plasmon generator 50 will be described in detail later.

The thermally-assisted magnetic recording head further includes a dielectric layer 23 disposed on the cladding layer 22 and surrounding the plasmon generator 50, a dielectric layer 24 disposed to cover the dielectric layer 23 and part of the plasmon generator 50, and a dielectric layer 25 disposed on the plasmon generator 50 and the dielectric layer 24. The thickness (the dimension in the Z direction) of a portion of the dielectric layer 24 that is apart from the medium facing surface 40 and lies on the plasmon generator 50 gradually increases with increasing distance from the medium-facing surface 40, and then becomes constant. The dielectric layers 23 to 25 are formed of alumina, for example.

The thermally-assisted magnetic recording head further includes a main pole 26 formed of a magnetic material and disposed such that the plasmon generator 50 lies between the main pole 26 and the core 20, and a dielectric layer 27 disposed around the main pole 26. The main pole 26 is disposed on the dielectric layer 25 and lies above part of each of the top surface of the plasmon generator 50, the end face of the dielectric layer 24 and the top surface of the dielectric layer 24. The main pole 26 has a front end face located in the medium-facing surface 40, a bottom surface, and a top surface. The fourth layers of the coupling portions 13A and 13B are embedded in the cladding layer 22 and the dielectric layers 23 to 25 and 27. The top surfaces of the main pole 26, the dielectric layer 27, and the fourth layers of the coupling portions 13A and 13B are even with each other. The dielectric layer 27 is formed of $SiO_2$, for example.

The thermally-assisted magnetic recording head further includes a coil 28 disposed on the dielectric layer 27, an insulating layer 29 disposed to cover the coil 28, and a yoke layer 30 formed of a magnetic material and disposed on the main pole 26, the coupling portions 13A and 13B, the dielectric layer 27 and the insulating layer 29. The yoke layer 30 magnetically couples the main pole 26 to the coupling portions 13A and 13B. The coil 28 is planar spiral-shaped and wound around portions of the yoke layer 30 that lie on the coupling portions 13A and 13B. The coil 28 is formed of a conductive material such as copper. The insulating layer 29 is formed of photoresist, for example.

The thermally-assisted magnetic recording head further includes a protective layer 31 disposed to cover the yoke layer 30. The protective layer 31 is formed of alumina, for example.

The parts from the return pole layer 11 to the yoke layer 30 constitute a write head section. The coils 15 and 28 produce magnetic fields corresponding to data to be written on the recording medium 80. The return pole layer 11, the coupling portions 13A and 13B, the yoke layer 30, and the main pole 26 form a magnetic path for passing magnetic fluxes corresponding to the magnetic fields produced by the coils 15 and 28. The coils 15 and 28 are connected in series or in parallel so that the magnetic flux corresponding to the magnetic field produced by the coil 15 and the magnetic flux corresponding to the magnetic field produced by the coil 28 flow in the same direction through the main pole 26. The main pole 26 allows the magnetic flux corresponding to the magnetic field produced by the coil 15 and the magnetic flux corresponding to the magnetic field produced by the coil 28 to pass, and produces a write magnetic field for writing data on the recording medium 80 by means of a perpendicular magnetic recording system.

As has been described, the thermally-assisted magnetic recording head according to the present embodiment includes the substrate 1 having the top surface 1a, the write head section disposed above the top surface 1a of the substrate 1, the read head section disposed between the top surface 1a of the substrate 1 and the write head section, and the medium-facing surface 40 facing the recording medium 80. The write head section is located on the front side in the direction of travel of the recording medium 80 (the Z direction), i.e., on the trailing side, relative to the read head section.

The write head section includes the coils 15 and 28, the main pole 26, the waveguide, and the plasmon generator 50. The waveguide includes the core 20 allowing light to propagate through, and the cladding provided around the core 20. In the present embodiment, in particular, the core 20 allows laser light emitted from a non-illustrated laser diode to propagate through. The cladding includes the cladding layers 19, 21 and 22.

Figure 1:
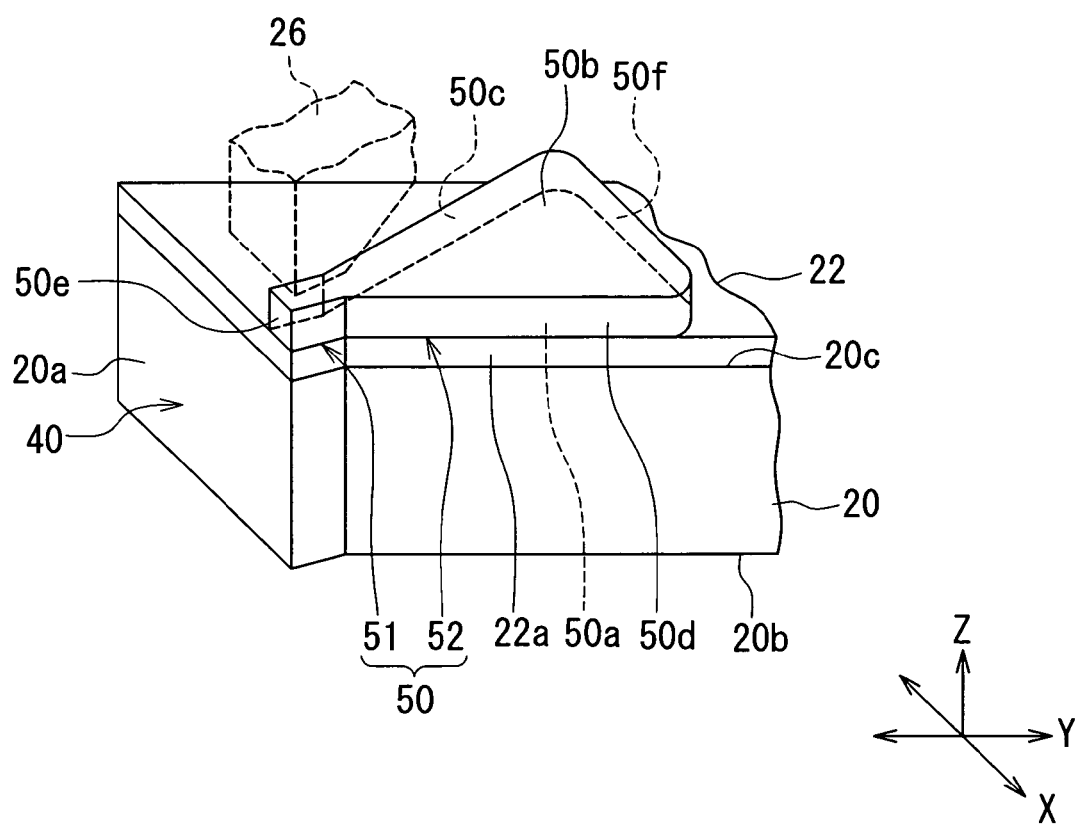
FIG. 1 is a perspective view showing the main part of a thermally-assisted magnetic recording head according to a first embodiment of the invention.

Now, the shape of the plasmon generator 50 will be described in detail with reference to FIG. 1. FIG. 1 is a perspective view showing the main part of the thermally-assisted magnetic recording head. As shown in FIG. 1, the plasmon generator 50 has a plasmon-exciting part 50a or a bottom surface, a top surface 50b, two side surfaces 50c and 50d, a front end face 50e, and a rear end face 50f. The front end face 50e is located in the medium-facing surface 40 and connects the plasmon-exciting part 50a, the top surface 50b and the two side surfaces 50c and 50d to each other. The front end face 50e generates near-field light on the principle to be described later. For example, the plasmon generator 50 is rectangular in cross section parallel to the medium-facing surface 40. The thickness (the dimension in the Z direction) of the plasmon generator 50 is generally constant regardless of the distance from the medium-facing surface 40.

Further, as shown in FIG. 1, the plasmon generator 50 includes a narrow portion 51 located near the medium-facing surface 40, and a wide portion 52 that is located farther from the medium-facing surface 40 than is the narrow portion 51. The width of the narrow portion 51 in the direction parallel to the medium-facing surface 40 and to the evanescent-light-generating surface 20c of the core 20 (the X direction) may be constant regardless of the distance from the medium-facing surface 40 or may decrease toward the medium-facing surface 40. The wide portion 52 is located on a side of the narrow portion 51 farther from the front end face 50e and is connected to the narrow portion 51. The width of the wide portion 52 in the track width direction (the X direction) is equal to that of the narrow portion 51 at the boundary between the narrow portion 51 and the wide portion 52, and is greater than that of the narrow portion 51 in the other positions.

The plasmon-exciting part 50a faces the evanescent-light-generating surface 20c with a predetermined distance therebetween. The cladding layer 22 includes an interposition part 22a interposed between the evanescent-light-generating surface 20c and the plasmon-exciting part 50a. Since the cladding layer 22 is part of the cladding, the cladding can be said to include the interposition part 22a.

Now, the principle of generation of near-field light in the present embodiment and the principle of thermally-assisted magnetic recording using the near-field light will be described in detail. Laser light emitted from a laser diode (not illustrated) enters the core 20. As shown in FIG. 2, the laser light 60 propagates through the core 20 toward the medium-facing surface 40, and reaches the vicinity of the plasmon generator 50. The evanescent-light-generating surface 20c of the core 20 generates evanescent light based on the laser light 60 propagating through the core 20. More specifically, the laser light 60 is totally reflected at the evanescent-light-generating surface 20c, and this causes the evanescent-light-generating surface 20c to generate evanescent light permeating into the interposition part 22a. In the plasmon generator 50, surface plasmons are excited on the plasmon-exciting part 50a through coupling with the evanescent light. The surface plasmons propagate to the front end face 50e, and the front end face 50e generates near-field light based on the surface plasmons.

The near-field light generated from the front end face 50e is projected toward the recording medium 80, reaches the surface of the recording medium 80 and heats a part of the magnetic recording layer of the recording medium 80. This lowers the coercivity of the part of the magnetic recording layer. In thermally-assisted magnetic recording, the part of the magnetic recording layer with the lowered coercivity is subjected to a write magnetic field produced by the main pole 26 for data writing.

In the present embodiment, the plasmon generator 50 has the narrow portion 51 and the wide portion 52. According to the present embodiment, when compared with the case where the wide portion 52 is not provided, the plasmon-exciting part 50a is larger in area and thus able to excite more surface plasmons. The present embodiment thereby makes it possible to generate near-field light of sufficient intensity.

A description will now be made on a method of manufacturing a plurality of thermally-assisted magnetic recording heads according to the present embodiment. The following description includes the description of a method of manufacturing the plasmon generator 50 according to the present embodiment. The method of manufacturing a plurality of thermally-assisted magnetic recording heads according to the present embodiment includes the steps of; fabricating a substructure including an array of a plurality of pre-head portions, the plurality of pre-head portions becoming the plurality of thermally-assisted magnetic recording heads later; and forming the plurality of thermally-assisted magnetic recording heads by cutting the substructure to separate the plurality of pre-head portions from each other and by forming the medium-facing surface 40 for each of the plurality of pre-head portions. In the step of fabricating the substructure, components of the plurality of thermally-assisted magnetic recording heads other than the substrates 1 are formed on a wafer that includes portions to become the substrates 1 of the plurality of thermally-assisted magnetic recording heads.

Figure 9:
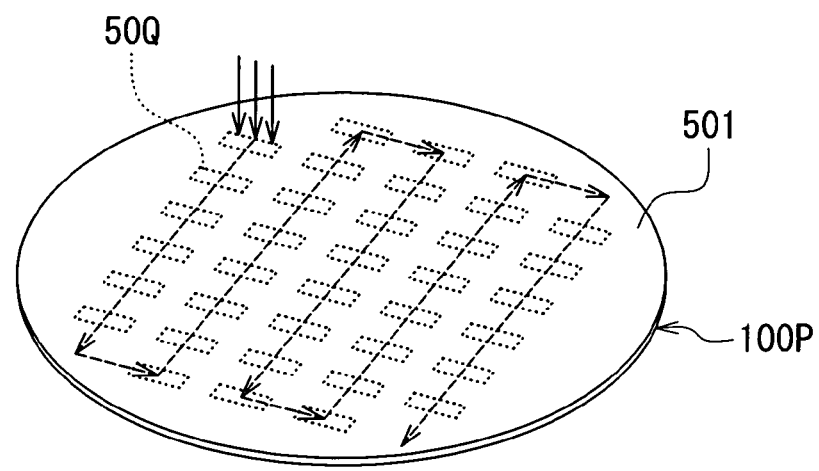
FIG. 9 is an explanatory diagram showing a heating step in the method of manufacturing a plurality of thermally-assisted magnetic recording heads according to the first embodiment of the invention.

The step of fabricating the substructure will now be described in detail with reference to FIG. 4A through FIG. 7C and FIG. 9. FIG. 4A through FIG. 7C each show a portion of a stack of layers formed in the process of fabricating the substructure, the portion corresponding to a single pre-head portion. FIG. 4A to FIG. 7A and FIG. 4B to FIG. 7B are cross-sectional views each showing the portion of the stack. FIG. 4C to FIG. 7C are plan views each showing the portion of the stack. FIG. 9 is an explanatory diagram showing a heating step. FIG. 4A to FIG. 7A each show a cross section that intersects the front end face of the main pole 26 and is perpendicular to the medium-facing surface 40 and the top surface 1a of the substrate 1. FIG. 4B to FIG. 7B each show a cross section of the portion of the stack taken at the position at which the medium-facing surface 40 is to be formed. In FIG. 4A to FIG. 7A and FIG. 4C to FIG. 7C, the symbol "ABS" indicates the position at which the medium-facing surface 40 is to be formed. The description of the steps in relation to FIG. 4A through FIG. 7C will be made with attention focused on the portion corresponding to a single pre-head portion. In practice, however, those steps are carried out at the same time on the portions corresponding to a plurality of pre-head portions.

Figure 4A:
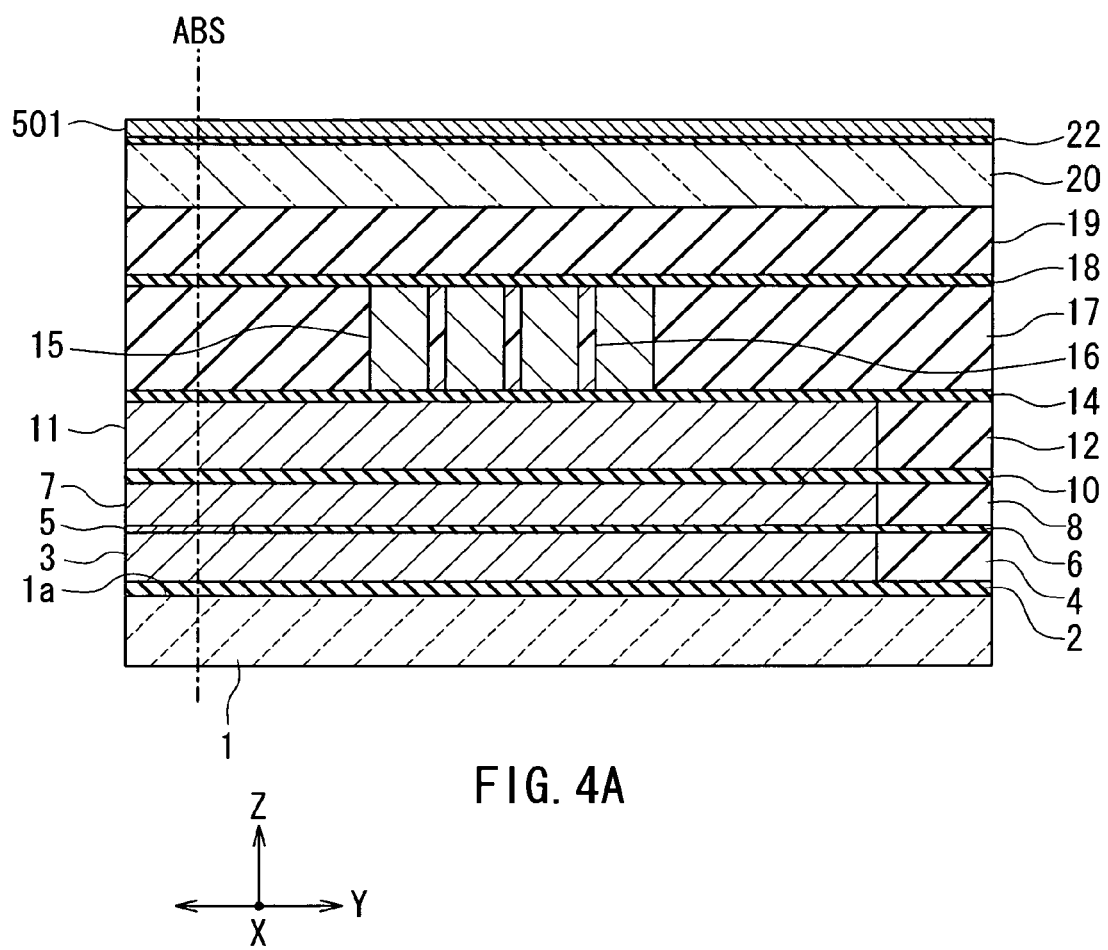
FIG. 4A to FIG. 4C are explanatory diagrams showing a step of a method of manufacturing a plurality of thermally-assisted magnetic recording heads according to the first embodiment of the invention.
Figure 4B:
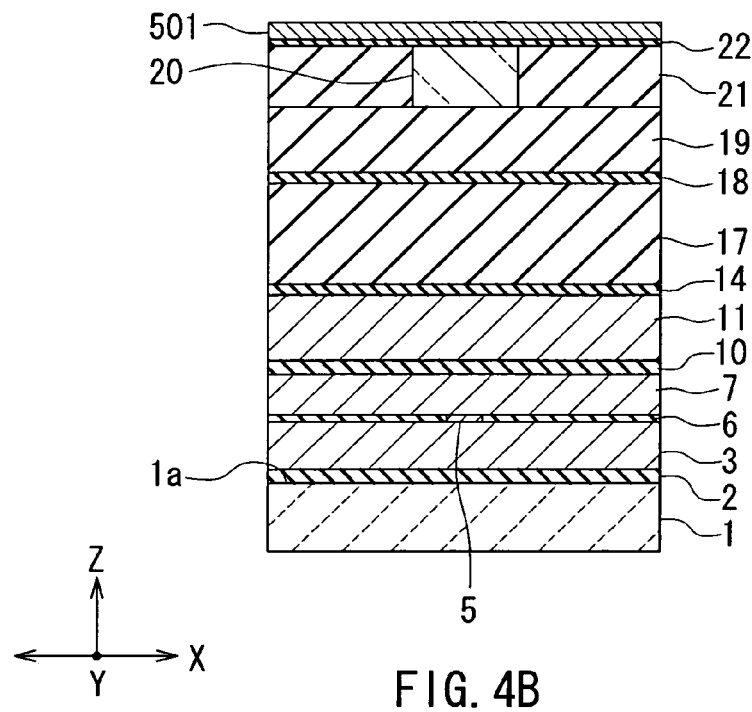
Figure 4C:
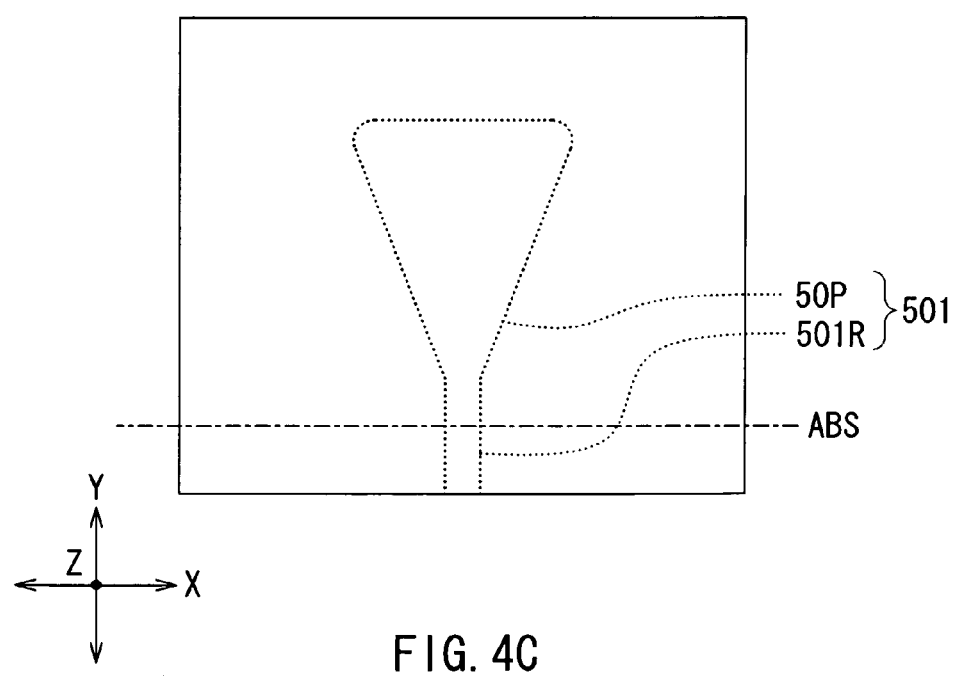

In the step of fabricating the substructure, as shown in FIG. 4A to FIG. 4C, the insulating layer 2 is formed on the substrate 1 first. Then, the bottom shield layer 3 is formed on the insulating layer 2. Next, the insulating layer 4 is formed to cover the bottom shield layer 3. The insulating layer 4 is then polished by, for example, chemical mechanical polishing (hereinafter referred to as CMP), until the bottom shield layer 3 is exposed. Next, the MR element 5 and the insulating layer 6 are formed on the bottom shield layer 3 and the insulating layer 4. The top shield layer 7 is then formed on the MR element 5 and the insulating layer 6. Next, the insulating layer 8 is formed to cover the top shield layer 7. The insulating layer 8 is then polished by, for example, CMP, until the top shield layer 7 is exposed.

Next, the nonmagnetic layer 10 is formed on the top shield layer 7 and the insulating layer 8. The return pole layer 11 is then formed on the nonmagnetic layer 10. Next, the insulating layer 12 is formed to cover the return pole layer 11. The insulating layer 12 is then polished by, for example, CMP, until the return pole layer 11 is exposed. Next, the insulating layer 14 is formed on the return pole layer 11 and the insulating layer 12.

The insulating layer 14 is then selectively etched to form therein two openings for exposing the top surface of the return pole layer 11. Next, the first layers of the coupling portions 13A and 13B (see FIG. 2) are formed on the return pole layer 11 at the positions of the two openings. Next, the coil 15 is formed on the insulating layer 14. The insulating layer 16 is then formed in the space between every adjacent turns of the coil 15. Next, the insulating layer 17 is formed over the entire top surface of the stack. The insulating layer 17 is then polished by, for example, CMP, until the first layers of the coupling portions 13A and 13B, the coil 15, and the insulating layer 16 are exposed. The top surfaces of the first layers of the coupling portions 13A and 13B, the coil 15, and the insulating layers 16 and 17 are thereby made even with each other. Next, the insulating layer 18 is formed over the first layers of the coupling portions 13A and 13B, the coil 15, and the insulating layers 16 and 17.

The insulating layer 18 is then selectively etched to form therein two openings for exposing the top surfaces of the first layers of the coupling portions 13A and 13B. Next, the second layers of the coupling portions 13A and 13B are formed on the first layers of the coupling portions 13A and 13B. Next, the cladding layer 19 is formed to cover the second layers of the coupling portions 13A and 13B. The cladding layer 19 is then polished by, for example, CMP, until the second layers of the coupling portions 13A and 13B are exposed. Next, the third layers of the coupling portions 13A and 13B are formed on the second layers of the coupling portions 13A and 13B.

Next, the core 20 is formed on the cladding layer 19. Then, the cladding layer 21 is formed to cover the cladding layer 19 and the core 20. The cladding layer 21 is then polished by, for example, CMP, until the third layers of the coupling portions 13A and 13B and the core 20 are exposed. Next, the cladding layer 22 is formed over the core 20 and the cladding layer 21. An initial film 501 made of a metal polycrystal is then formed on the cladding layer 22. As shown in FIG. 4C, in the portion corresponding to a single pre-head portion, the initial film 501 includes a pre-plasmon-generator portion 50P and a portion to be removed 501R contiguous with each other. The pre-plasmon-generator portion 50P is the portion to become the plasmon generator 50 later. The portion to be removed 501R is to be removed in the step of forming the plurality of thermally-assisted magnetic recording heads. The entire initial film 501 includes a plurality of pre-plasmon-generator portions 50P to become a plurality of plasmon generators 50 corresponding to the plurality of thermally-assisted magnetic recording heads, and a plurality of portions to be removed 501R. The initial film 501 has a thickness on the order of 100 μm, for example.

Figure 5A:
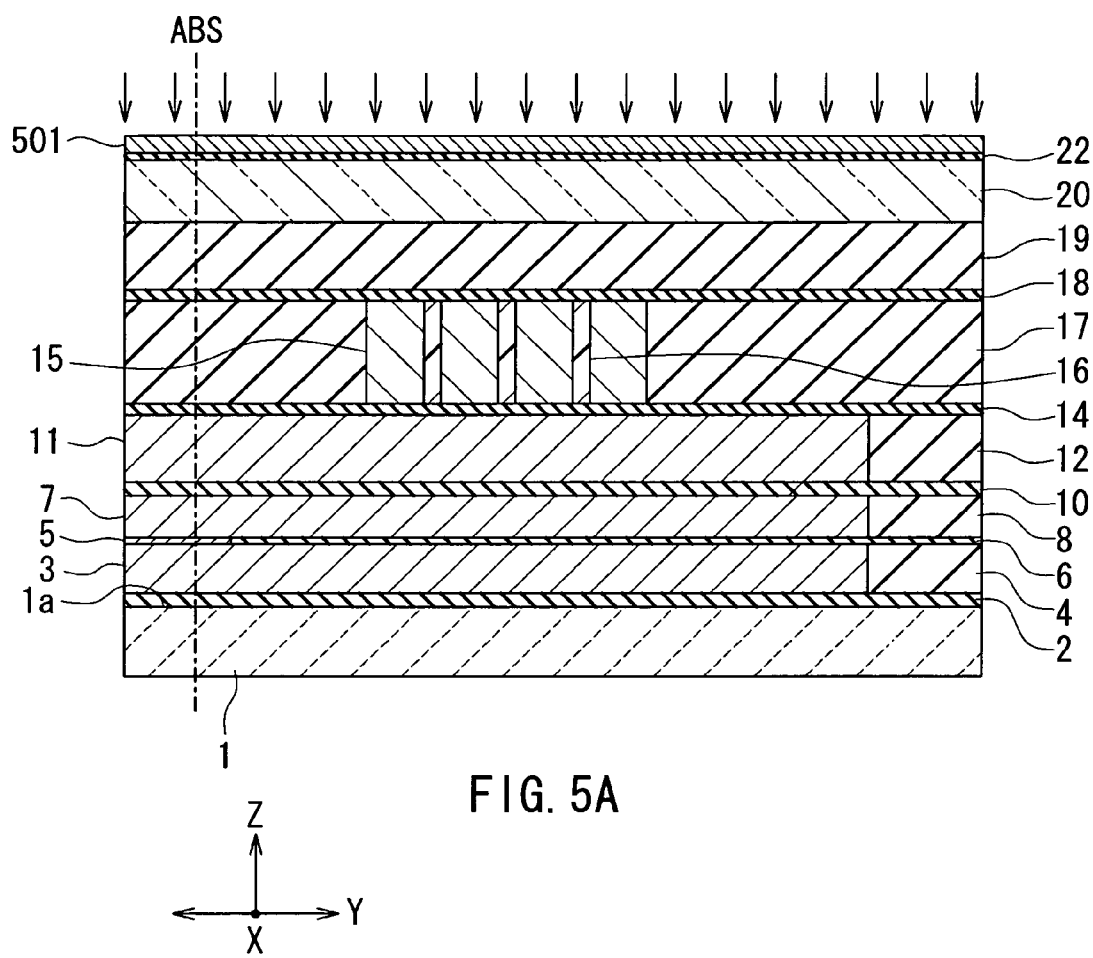
FIG. 5A to FIG. 5C are explanatory diagrams showing a step that follows the step shown in FIG. 4A to FIG. 4C.
Figure 5B:
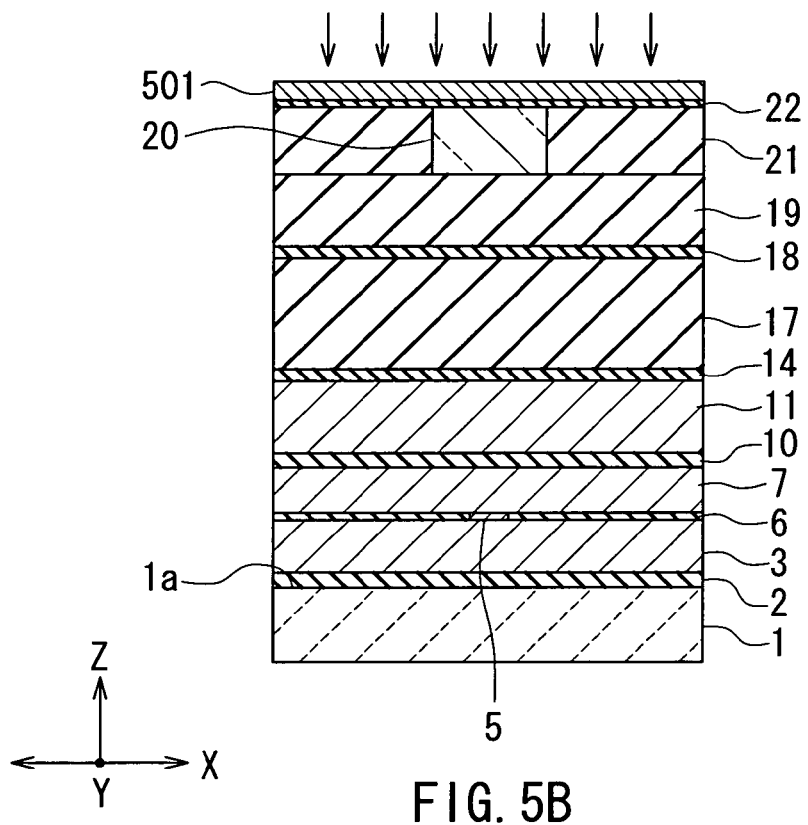
Figure 5C:
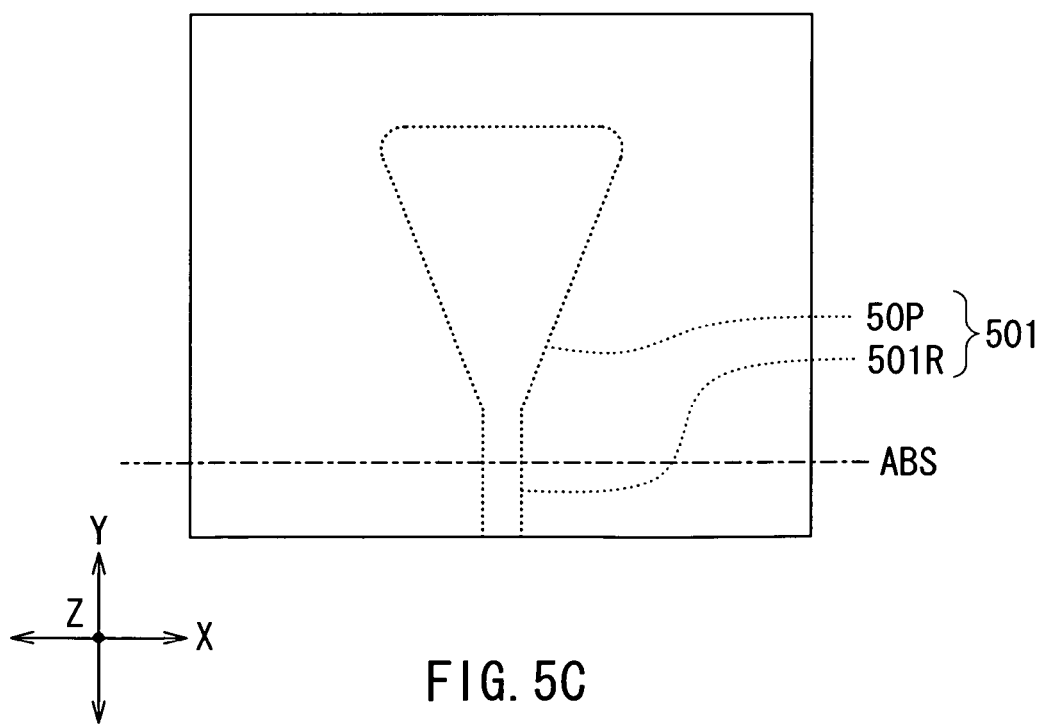

FIG. 5A to FIG. 5C and FIG. 9 show the next step. In this step, first, the initial film 501 is heated with heating light so that a plurality of crystal grains constituting the metal polycrystal grow at least in the plurality of pre-plasmon-generator portions 50P. This step will be referred to as the heating step. In FIG. 5A, FIG. 5B and FIG. 9, the solid arrows indicate the heating light. In the present embodiment, the initial film 501 is directly irradiated with the heating light. For example, laser light is employed as the heating light. An irradiation apparatus for applying the heating light includes, for example, a laser light source for emitting laser light and a scanning unit for scanning the laser light emitted from the laser light source.

In FIG. 9, the symbol 100P represents a stack of layers formed in the process of fabricating the substructure. The initial film 501 is exposed at the top surface of the stack 100P. FIG. 9 shows a plurality of regions 50Q in dotted lines. The plurality of regions 50Q are the minimum regions of the initial film 501 that are to be irradiated with the heating light. The plurality of regions 50Q respectively include the plurality of pre-plasmon-generator portions 50P.

In the present embodiment, the initial film 501 is continuously irradiated with the heating light while the heating light is being scanned so that the plurality of regions 50Q are irradiated with the heating light one by one. In FIG. 9, the dashed arrows indicate the path of the heating light on the initial film 501. In this way, the plurality of pre-plasmon-generator portions 50P included in the initial film 501 are heated one by one. Then, the heating of the initial film 501 is stopped.

In the initial film 501, at least the plurality of pre-plasmon-generator portions 50P are heated with the heating light to 300° C. or higher, for example. This allows the crystal grains constituting the metal polycrystal to grow at least in the plurality of pre-plasmon-generator portions 50P of the initial film 501. The diameter of the crystal grains of the metal polycrystal in the plurality of pre-plasmon-generator portions 50P after the heating is preferably two times or greater, more preferably four times or greater than before the heating.

Figure 10:
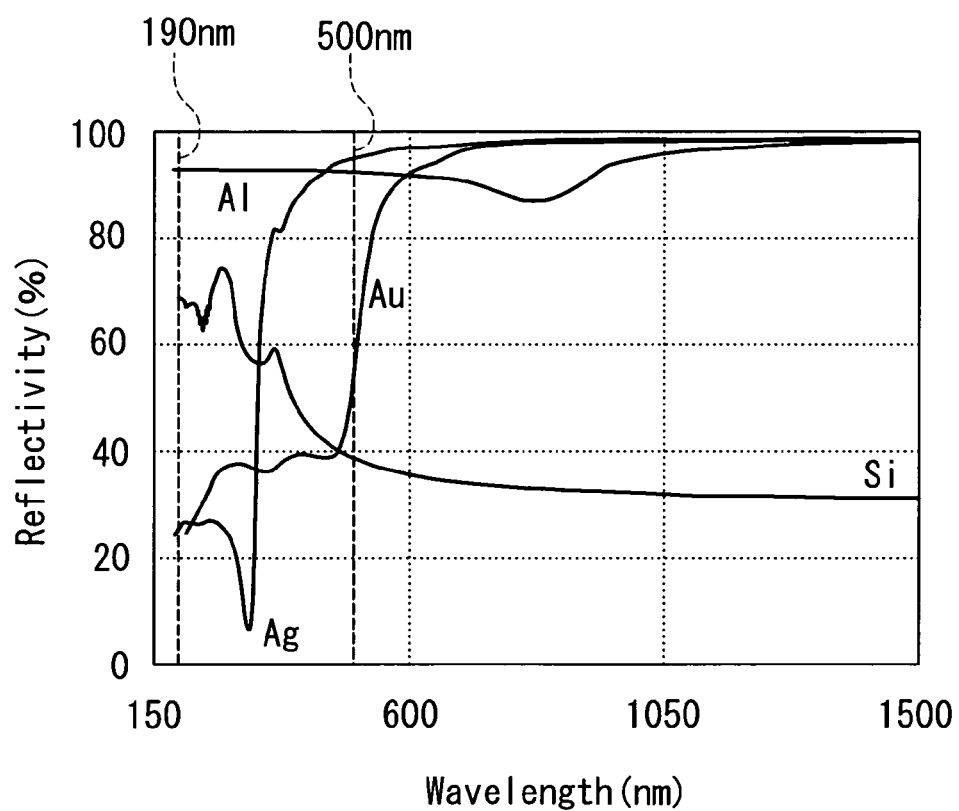
FIG. 10 is a characteristic diagram showing the reflectivities of materials usable for a plasmon generator.

To enable effective heating of the initial film 501 with the heating light, it is preferable that the wavelength of the heating light be selected according to the material for forming the initial film 501 (the plasmon generator 50), from within the range of wavelengths at which the material has a low reflectivity for the light. FIG. 10 shows the reflectivities of Au, Ag, and Al which are usable as the material of the initial film 501 (the plasmon generator 50). In FIG. 10, the horizontal axis represents the wavelength and the vertical axis represents the reflectivity. Note that the reflectivity shown in FIG. 10 was determined by calculation using the refractive index and the extinction coefficient. As shown in FIG. 10, the reflectivity of Au is low at the wavelengths in the range of 190 nm to 500 nm. Thus, where the material of the initial film 501 is Au, the wavelength of the heating light is preferably selected from within the range of 190 nm to 500 nm.

An example of the conditions for the heating step where the material of the initial film 501 is Au is as follows. The heating light is to be laser light having a wavelength of 445 nm and an output power of 7200 mW. The scanning speed of the heating light across the initial film 501 is to be 30 mm/s. The initial film 501 was actually heated under such conditions, and as a result, the temperature of the pre-plasmon-generator portions 50P reached 500° C. or higher. Further, the diameter of the crystal grains of the metal polycrystal in the pre-plasmon-generator portions 50P was about 80 nm before heating, but became about 390 nm after heating.

As will be described later in more detail, an increase in the temperature of the MR element 5 caused by the heating of the initial film 501 may lead to deterioration in the characteristics of the MR element 5. Hence, the characteristics of the MR element 5 (the magnetoresistive change of the MR element 5 in response to an external magnetic field) were examined with a quasi-static tester after the initial film 501 was heated under the above-described conditions, and the results showed no deterioration in the characteristics of the MR element 5.

Figure 6A:
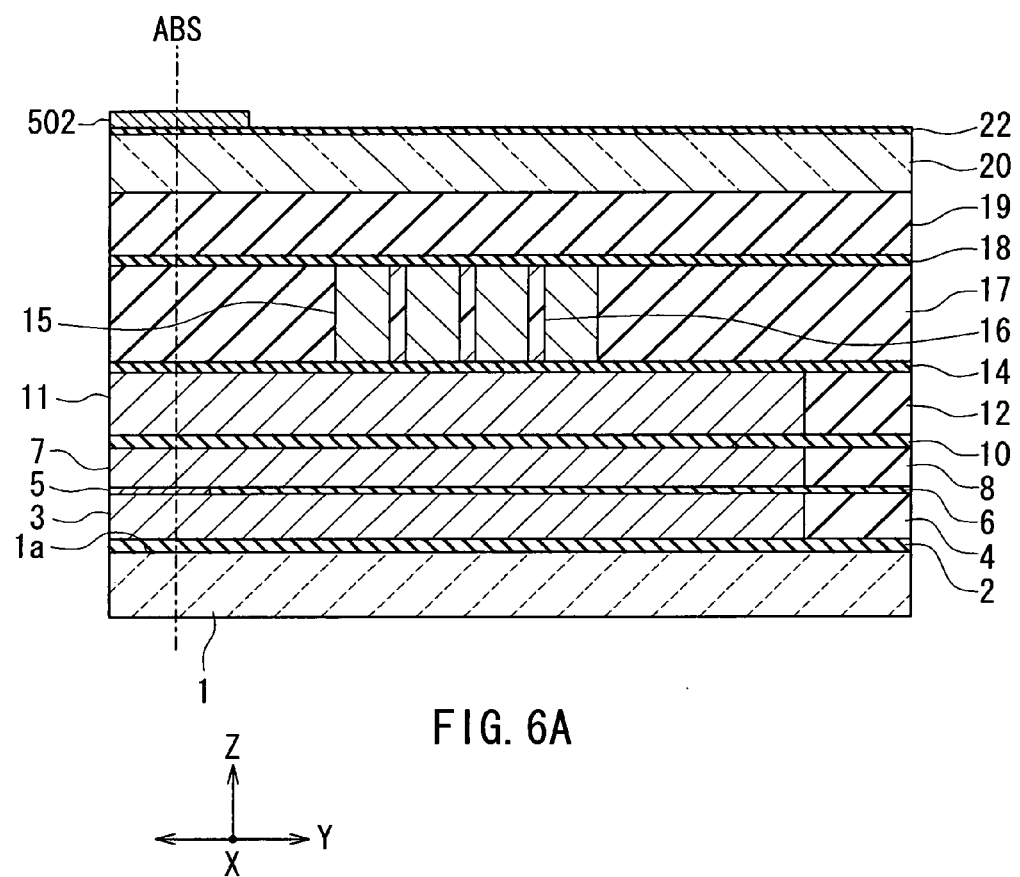
FIG. 6A to FIG. 6C are explanatory diagrams showing a step that follows the step shown in FIG. 5A to FIG. 5C.
Figure 6B:
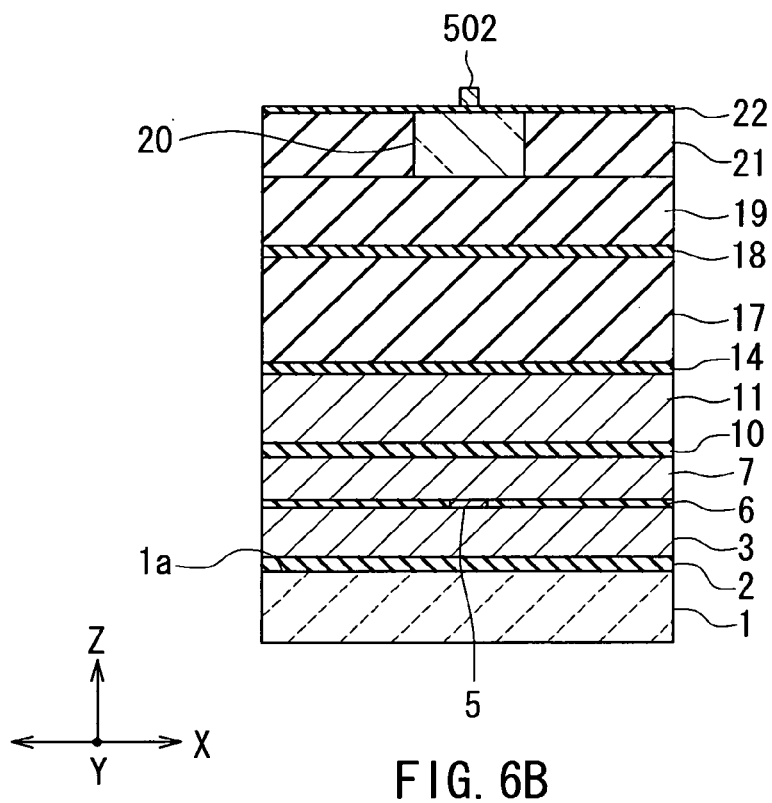
Figure 6C:
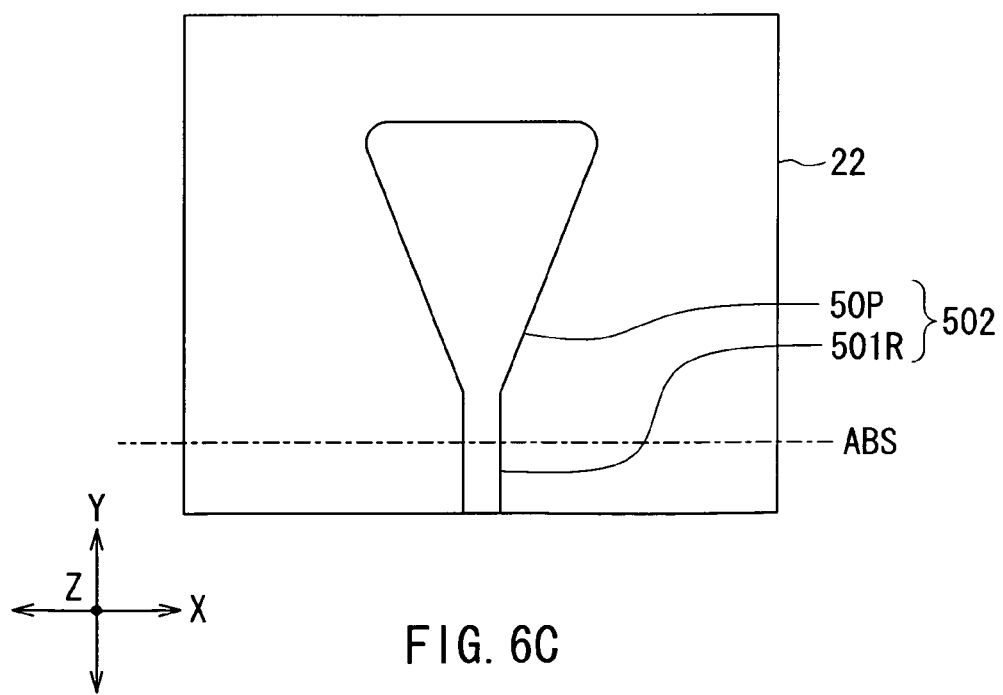

FIG. 6A to FIG. 6C show a step after the stop of the heating of the initial film 501. In this step, the initial film 501 having been heated is selectively etched into a plurality of patterned films 502 corresponding to the plurality of pre-plasmon-generator portions 50P. Each of the plurality of patterned films 502 is made up of the pre-plasmon-generator portion 50P and the portion to be removed 501R. The etching of the initial film 501 is performed by, for example, ion beam etching using an etching mask formed by photolithography. The etching mask is removed after the initial film 501 is etched.

Figure 7A:
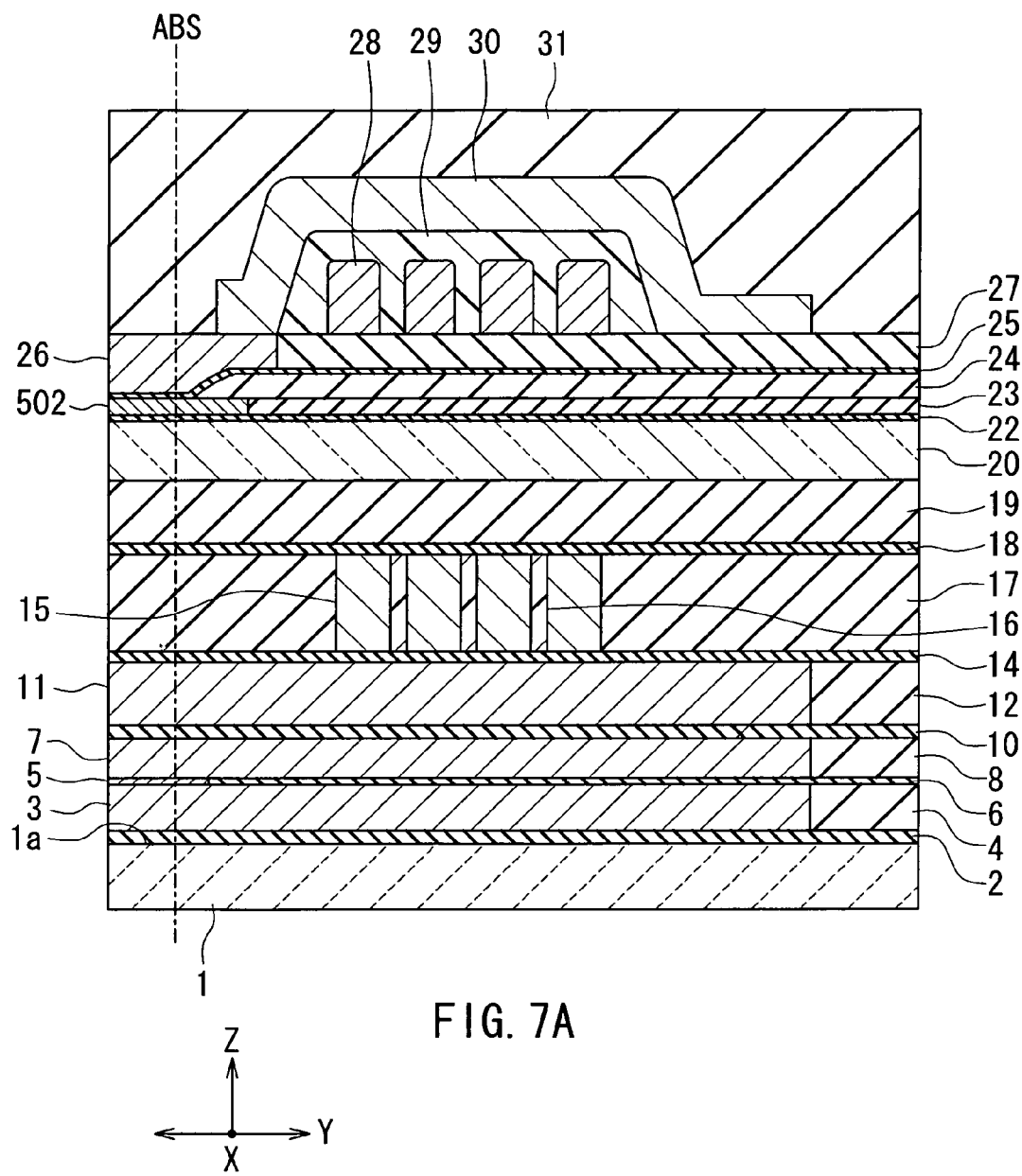
FIG. 7A to FIG. 7C are explanatory diagrams showing a step that follows the step shown in FIG. 6A to FIG. 6C.
Figure 7B:
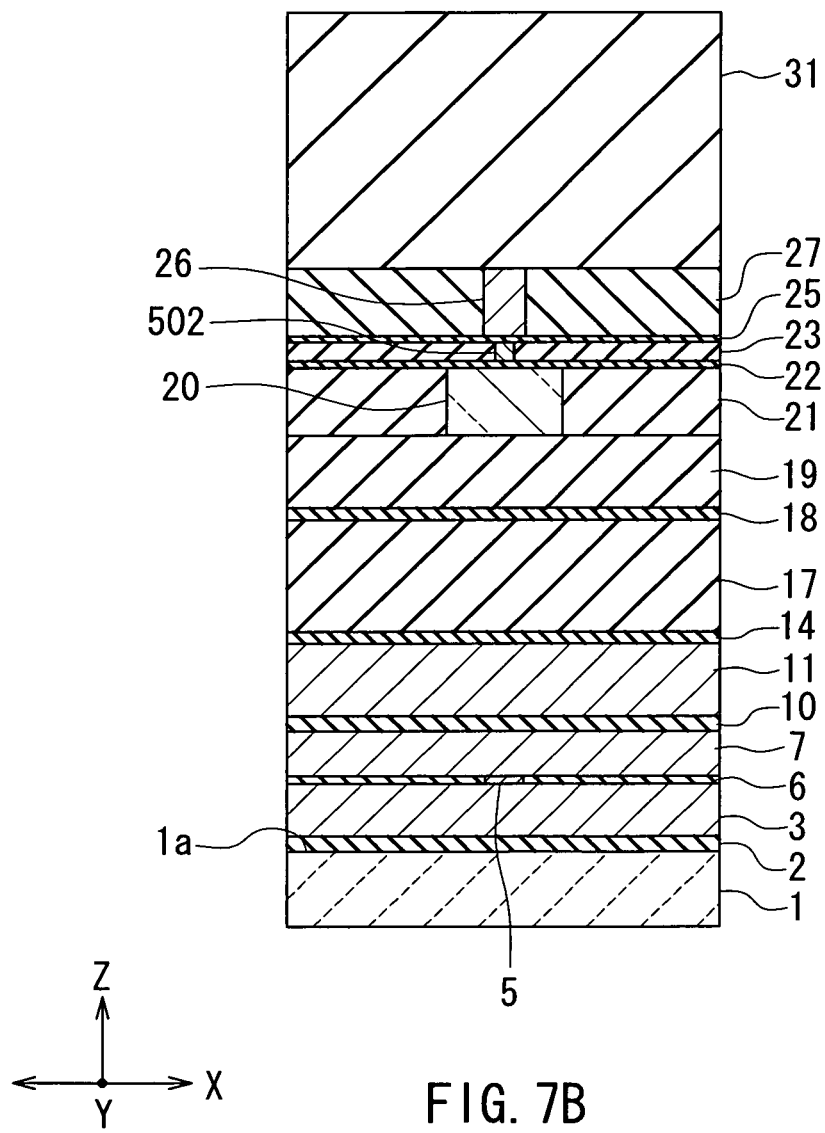
Figure 7C:
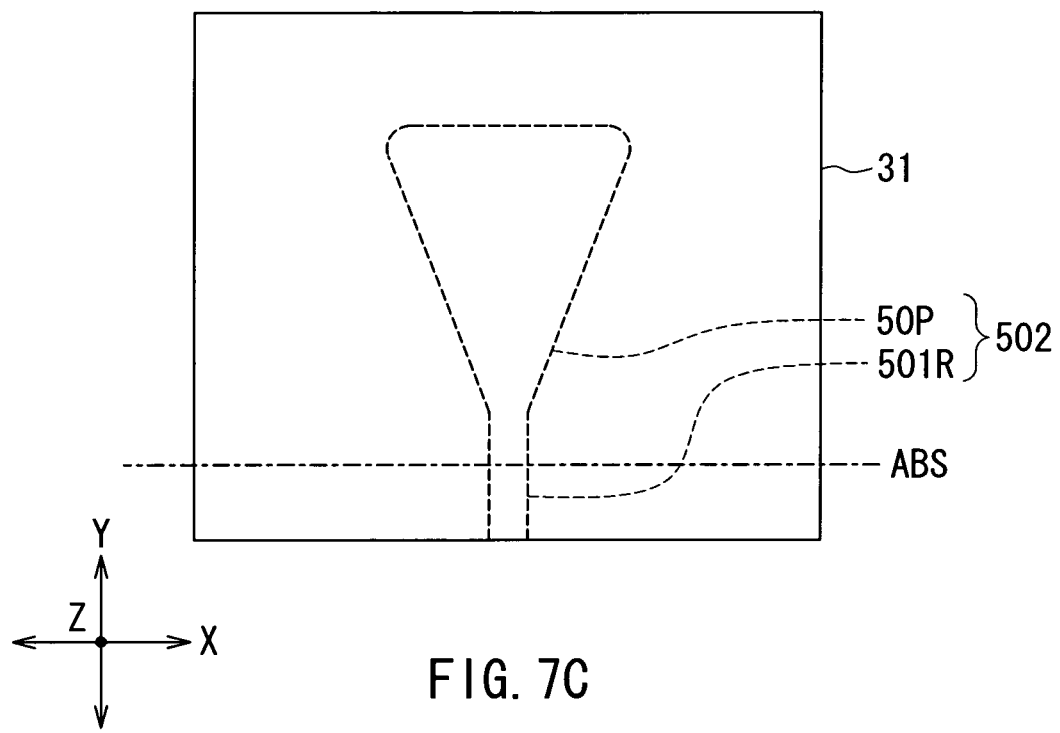

FIG. 7A to FIG. 7C show the next step. In this step, first, the dielectric layer 23 is formed to cover the cladding layer 22 and the patterned film 502. The dielectric layer 23 is then polished by, for example, CMP, until the patterned film 502 is exposed. Then, the dielectric layer 24 is formed on the dielectric layer 23 and part of the patterned film 502. Next, the dielectric layer 25 is formed on the patterned film 502 and the dielectric layer 24. The cladding layer 22 and the dielectric layers 23 to 25 are then selectively etched to form therein openings for exposing the top surfaces of the third layers of the coupling portions 13A and 13B. Next, the main pole 26 is formed on the dielectric layer 25, and the fourth layers of the coupling portions 13A and 13B are formed on the third layers of the coupling portions 13A and 13B. Next, the dielectric layer 27 is formed to cover the main pole 26 and the fourth layers of the coupling portions 13A and 13B. The dielectric layer 27 is then polished by, for example, CMP, until the main pole 26 and the fourth layers of the coupling portions 13A and 13B are exposed.

Next, the coil 28 is formed on the dielectric layer 27. The insulating layer 29 is then formed to cover the coil 28. Next, the yoke layer 30 is formed over the main pole 26, the fourth layers of the coupling portions 13A and 13B, the dielectric layer 27, and the insulating layer 29. Next, the protective layer 31 is formed to cover the yoke layer 30. Wiring, terminals, and other components are then formed on the top surface of the protective layer 31. The substructure is completed through a series of steps described above.

Figure 8A:
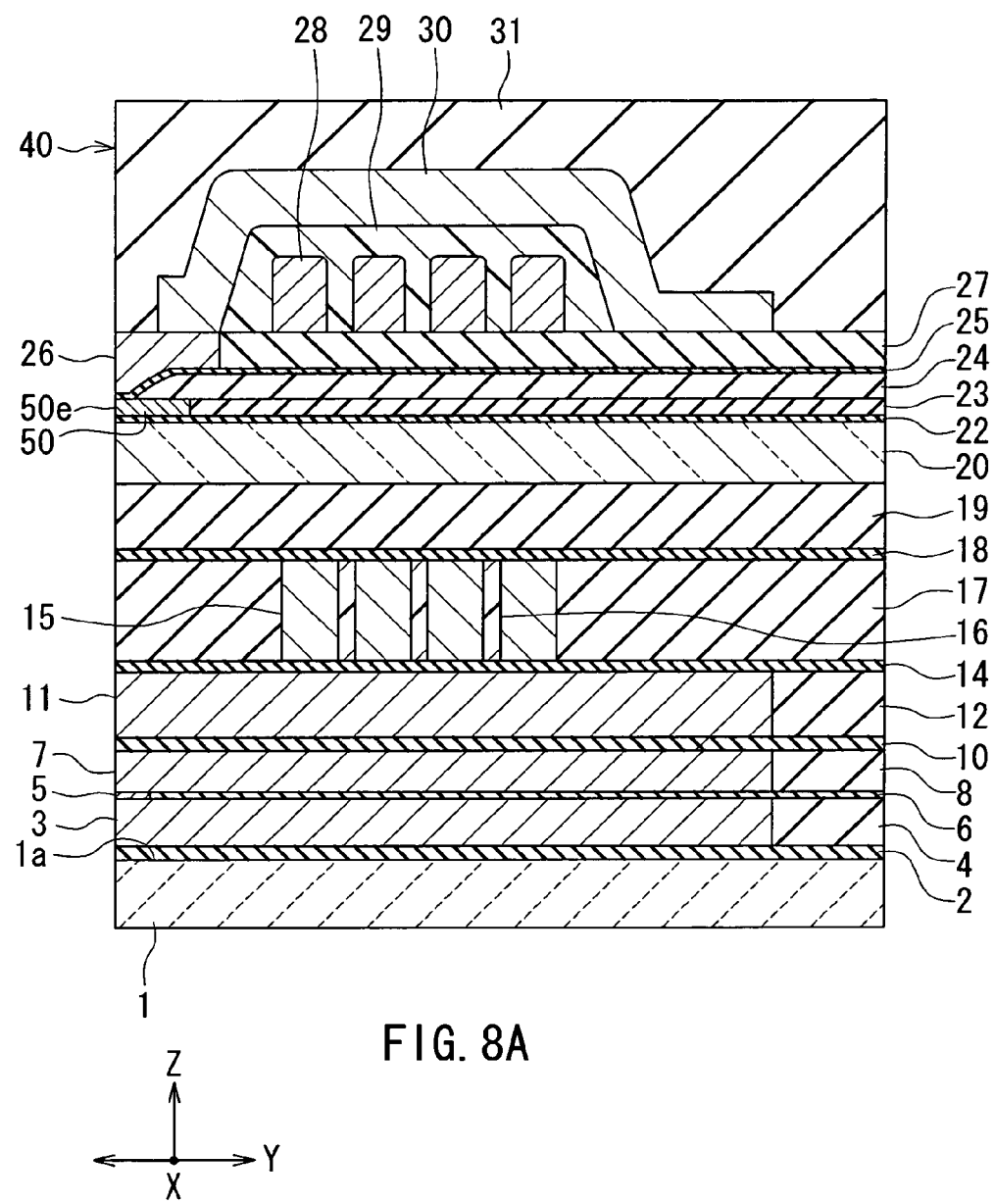
FIG. 8A to FIG. 8C are explanatory diagrams showing a step that follows the step shown in FIG. 7A to FIG. 7C.
Figure 8B:
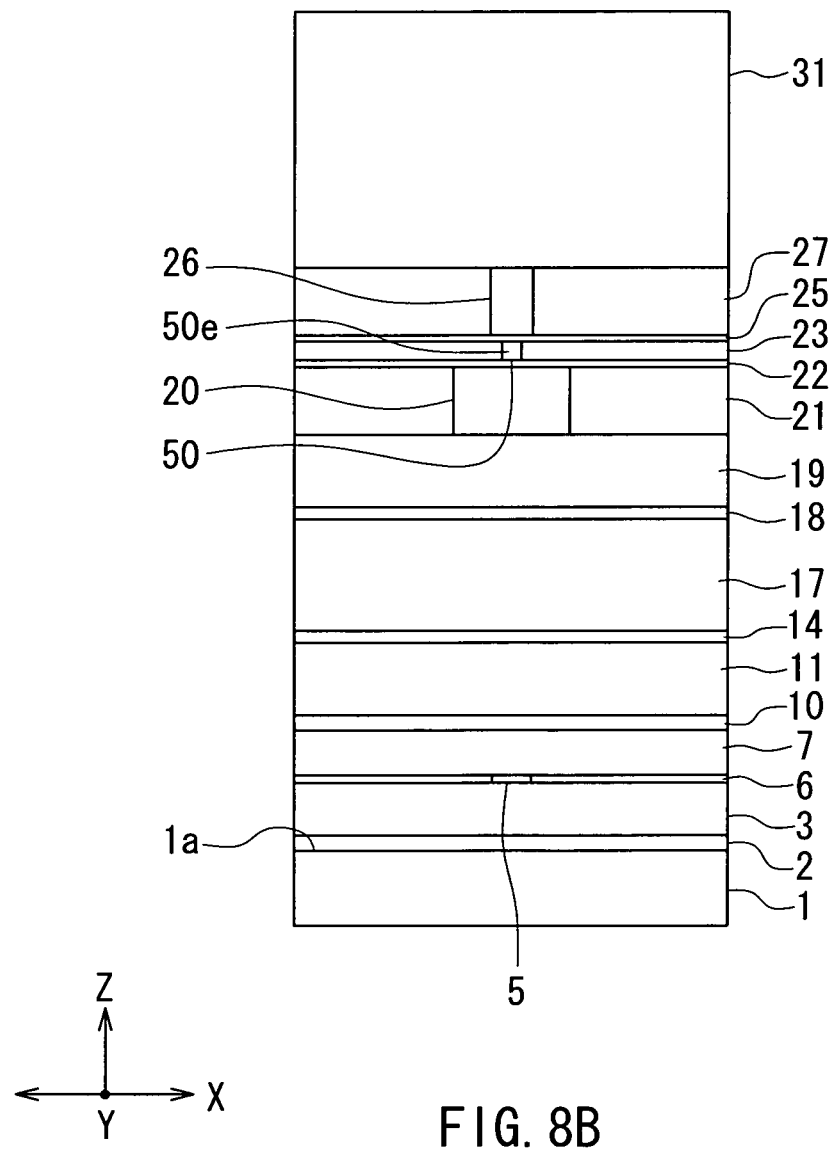
Figure 8C:
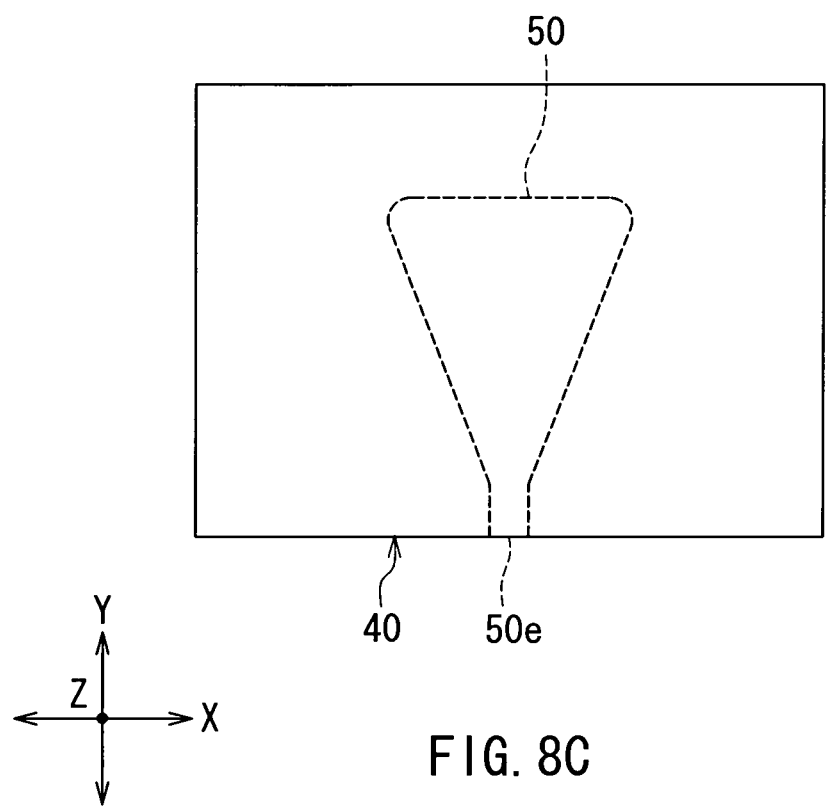

The step of forming the plurality of thermally-assisted magnetic recording heads will now be described with reference to FIG. 8A to FIG. 8C. FIG. 8A to FIG. 8C show one of the plurality of pre-head portions included in the substructure. FIG. 8A is a cross-sectional view of the pre-head portion. FIG. 8B is a front view of the pre-head portion. FIG. 8C is a plan view of the pre-head portion. FIG. 8A shows a cross section that intersects the front end face of the main pole 26 and is perpendicular to the medium-facing surface 40 and the top surface 1a of the substrate 1. FIG. 8B shows the medium-facing surface 40.

In the step of forming the plurality of thermally-assisted magnetic recording heads, as previously described, the plurality of thermally-assisted magnetic recording heads are formed by cutting the substructure to separate the plurality of pre-head portions from each other and by forming the medium-facing surface 40 for each of the plurality of pre-head portions. The medium-facing surface 40 is formed by polishing the surfaces that are formed by cutting the substructure. In the step of forming the plurality of thermally-assisted magnetic recording heads, the plurality of portions to be removed 501R are removed from the plurality of patterned films 502, and each of the plurality of pre-plasmon-generator portions 50P is provided with the front end face 50e, whereby the plurality of pre-plasmon-generator portions 50P become a plurality of plasmon generators 50.

As described above, the method of manufacturing a plurality of thermally-assisted magnetic recording heads according to the present embodiment includes the step of fabricating the substructure and the step of forming the plurality of thermally-assisted magnetic recording heads. The step of fabricating the substructure includes the steps of: forming the initial film 501 made of a metal polycrystal and including a plurality of pre-plasmon-generator portions 50P; heating the initial film 501 with heating light so that a plurality of crystal grains constituting the metal polycrystal grow at least in the plurality of pre-plasmon-generator portions 50P; and stopping the heating of the initial film 501. In the step of forming the plurality of thermally-assisted magnetic recording heads, each of the plurality of pre-plasmon-generator portions 50P is provided with the front end face 50e, and the plurality of pre-plasmon-generator portions 50P thereby become a plurality of plasmon generators 50.

The method of manufacturing the plasmon generator 50 according to the present embodiment includes the steps of: forming the initial film 501 made of a metal polycrystal and including the pre-plasmon-generator portion 50P; heating the initial film 501 with heating light so that a plurality of crystal grains constituting the metal polycrystal grow at least in the pre-plasmon-generator portion 50P; stopping the heating of the initial film 501; and forming the plasmon generator 50 by processing the initial film 501 after the step of stopping the heating. The step of forming the plasmon generator 50 includes the step of providing the pre-plasmon-generator portion 50P with the front end face 50e. The step of forming the plasmon generator 50 includes a series of steps from the step shown in FIG. 6A to FIG. 6C to the step shown in FIG. 8A to FIG. 8C.

In the present embodiment, before the front end face 50e of the plasmon generator 50 is provided, the initial film 501 is heated with the heating light so that a plurality of crystal grains constituting the metal polycrystal grow at least in the pre-plasmon-generator portion 50P. This prevents the growth of the plurality of crystal grains and the resulting deformation of the plasmon generator 50 when the thermally-assisted magnetic recording head is in use, that is, when the plasmon generator 50 is in use.

If the plasmon generator 50 is heated after the front end face 50e is provided, the plasmon generator 50 may be deformed to cause a change in the position of the front end face 50e. To prevent this, in the present embodiment, the front end face 50e is provided after the initial film 501 is heated. Thus, the heating step will never cause a change in the position of the front end face 50e of the plasmon generator 50.

Consequently, the present embodiment makes it possible to manufacture the plasmon generator 50 of high reliability and a plurality of thermally-assisted magnetic recording heads each having the plasmon generator 50 of high reliability.

Further, the present embodiment makes it possible to heat the initial film 501 without causing deterioration in the characteristics of the MR element 5. This benefit will now be described in comparison with a method of manufacturing a thermally-assisted magnetic recording head of a comparative example. The method of manufacturing a thermally-assisted magnetic recording head of the comparative example is different from the method of manufacturing a plurality of thermally-assisted magnetic recording heads according to the present embodiment in that the entire stack 100P after the formation of the initial film 501 is heated in a heating furnace in order to heat the initial film 501.

When the entire stack 100P is heated, the MR element 5 included in the stack 100P is also heated. As mentioned previously, the GMR element and the TMR element, which are employable as the MR element 5, have an antiferromagnetic layer to pin the magnetization direction of the pinned layer by means of exchange coupling with the pinned layer. If the antiferromagnetic layer is heated to a blocking temperature or higher, the exchange coupling force between the antiferromagnetic layer and the pinned layer is lost, and as a result, the magnetization direction of the pinned layer may be changed to a direction other than the predetermined direction. This would lead to deterioration in the characteristics of the MR element 5. Thus, in the comparative example, the stack 100P needs to be heated at temperatures within the range of, for example, 200° C. to 250° C. so as to prevent the antiferromagnetic layer from being heated to the blocking temperature or higher. However, heating at such temperatures would not allow the crystal grains constituting the metal polycrystal to sufficiently grow in the pre-plasmon-generator portions 50P. In this case, when the thermally-assisted magnetic recording head is in use, that is, when the plasmon generator 50 is in use, the crystal grains constituting the metal polycrystal forming the plasmon generator 50 may grow to cause deformation of the plasmon generator 50.

In contrast to this, in the present embodiment, the initial film 501 is heated by direct irradiation with the heating light. In this case, none or hardly any of the heating light could reach the MR element 5. When the initial film 501 is heated, heat may be transferred from the initial film 501 to the MR element 5 through a plurality of layers interposed between the initial film 501 and the MR element 5. However, choosing appropriate conditions for the heating step, such as a short duration of irradiation with the heating light, makes it possible to dissipate the heat so that the antiferromagnetic layer is prevented from being heated to the blocking temperature or higher. Consequently, according to the present embodiment, it is possible to sufficiently heat the initial film 501 while deterioration of the characteristics of the MR element 5 is prevented.

Second Embodiment

Figure 11:
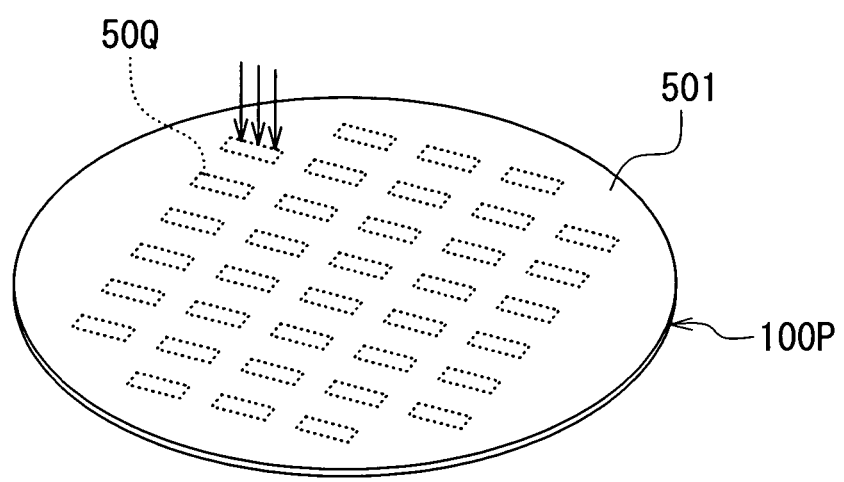
FIG. 11 is an explanatory diagram showing a heating step in a method of manufacturing a plurality of thermally-assisted magnetic recording heads according to a second embodiment of the invention.

A method of manufacturing a plasmon generator and a method of manufacturing a plurality of thermally-assisted magnetic recording heads according to a second embodiment of the invention will now be described with reference to FIG. 11. FIG. 11 is an explanatory diagram showing the heating step of the present embodiment. In the present embodiment, similarly to the first embodiment, the initial film 501 is irradiated with the heating light in the heating step while the heating light is being scanned so that the plurality of regions 50Q of the initial film 501 are irradiated with the heating light one by one. However, in the present embodiment, the initial film 501 is intermittently irradiated with the heating light so that the heating light is applied to the plurality of regions 50Q of the initial film 501 and not to the other regions. The control of the heating step of the present embodiment can be exercised by, for example, controlling the irradiation apparatus using a computer.

According to the present embodiment, since only the plurality of regions 50Q are irradiated with the heating light, it is possible to reduce the time required for the heating step and consequently improve the productivity of the thermally-assisted magnetic recording heads, when compared with the first embodiment. Further, the present embodiment makes it possible to reduce the amount of heat applied by the heating light to the entire initial film 501 and consequently prevent deterioration of the characteristics of the MR element 5 with higher reliability, when compared with the first embodiment.

The remainder of configuration, function and effects of the present embodiment are similar to those of the first embodiment.

Third Embodiment

A method of manufacturing a plasmon generator and a method of manufacturing a plurality of thermally-assisted magnetic recording heads according to a third embodiment of the invention will now be described. In the present embodiment, the heating step heats the plurality of pre-plasmon-generator portions 50P of the initial film 501 simultaneously with heating light of high output power. In the heating step, the conditions such as the wavelength and the output power of the heating light and the irradiation duration are optimized so that the initial film 501 can be sufficiently heated while deterioration of the characteristics of the MR element 5 is prevented. For example, where Au is used as the material of the initial film 501, the wavelength of the heating light is preferably selected from within the range of 190 nm to 500 nm, as in first embodiment. In this case, the irradiation apparatus for applying the heating light may be, for example, a UV lamp of high output power. The heating step may be carried out in the atmospheric environment or in a vacuum.

In the present embodiment, the initial film 501 may be directly irradiated with the heating light if the material of the initial film 501 and the wavelength of the heating light can be combined in such a manner as to allow the initial film 501 to have a sufficiently low reflectivity for the heating light.

Alternatively, an anti-reflection film having a lower reflectivity than that of the initial film 501 for the heating light can be formed on the initial film 501 so that this anti-reflection film is irradiated with the heating light in the heating step. Now, a description will be made on the method of manufacturing a plasmon generator and the method of manufacturing a plurality of thermally-assisted magnetic recording heads according to the present embodiment for the case of irradiating the anti-reflection film with the heating light.

Figure 12A:
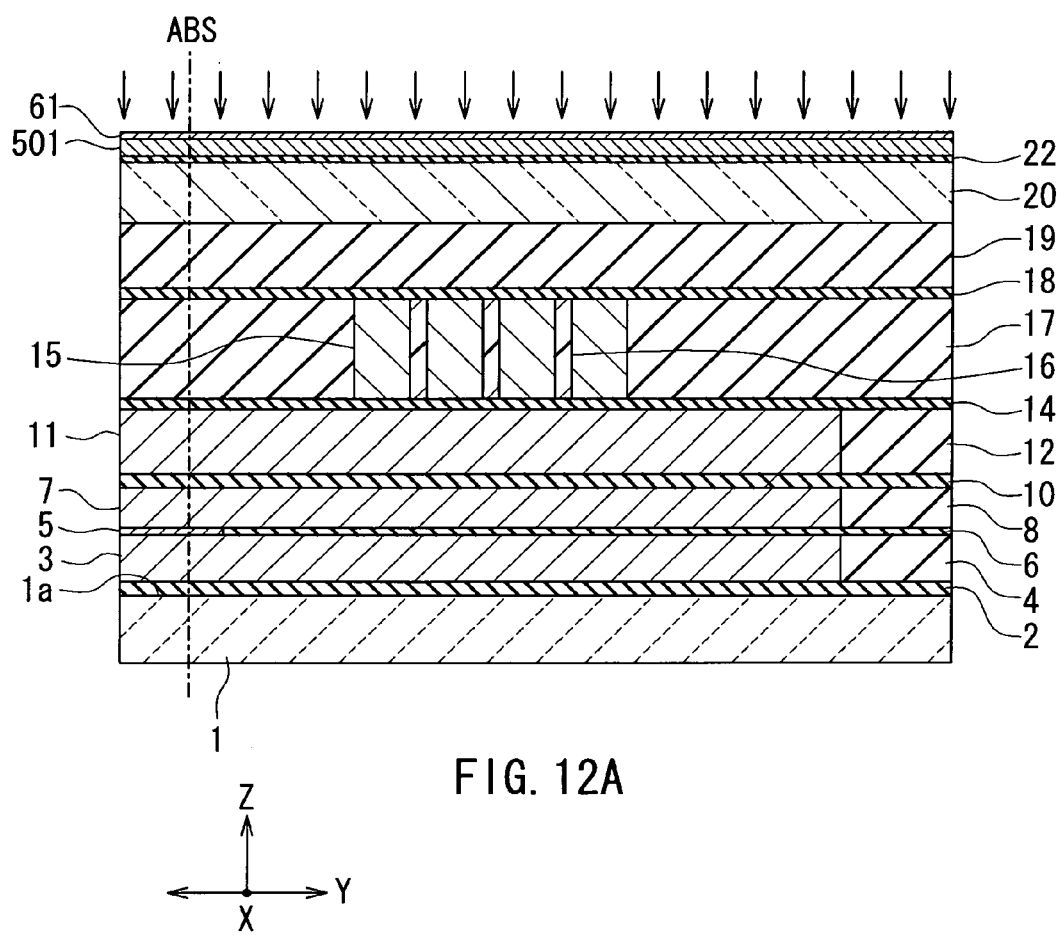
FIG. 12A to FIG. 12C are explanatory diagrams showing a step of a method of manufacturing a plurality of thermally-assisted magnetic recording heads according to a third embodiment of the invention.
Figure 12B:
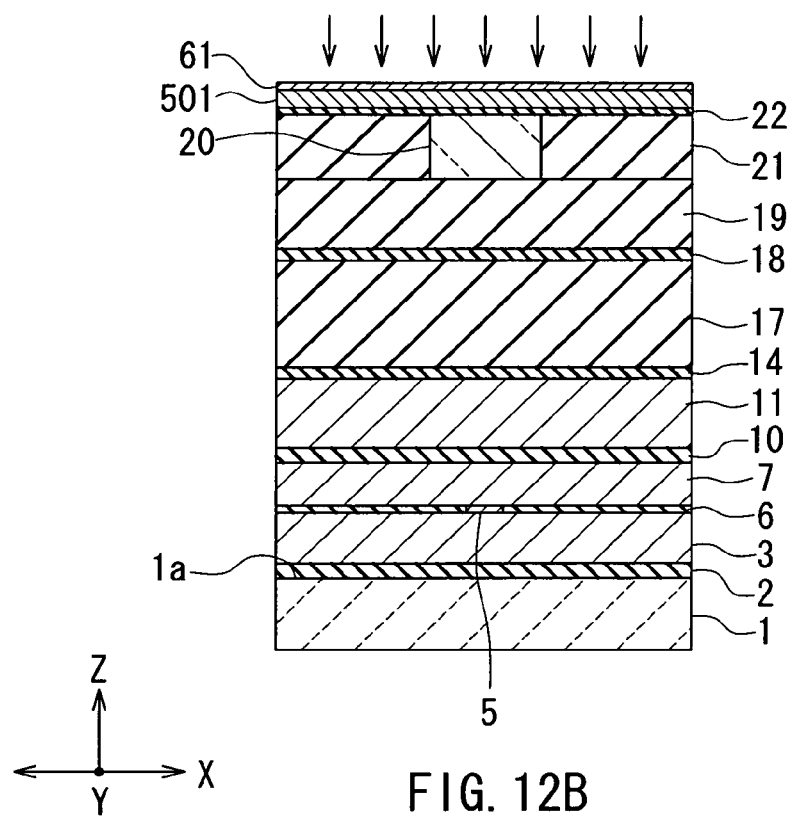
Figure 12C:
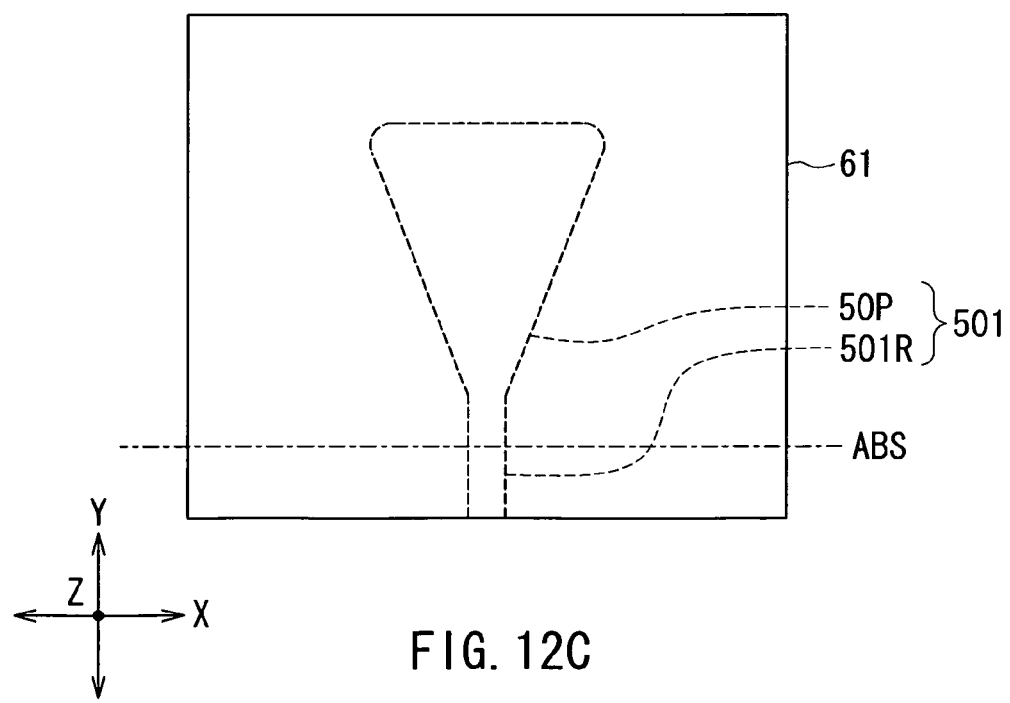
Figure 13:
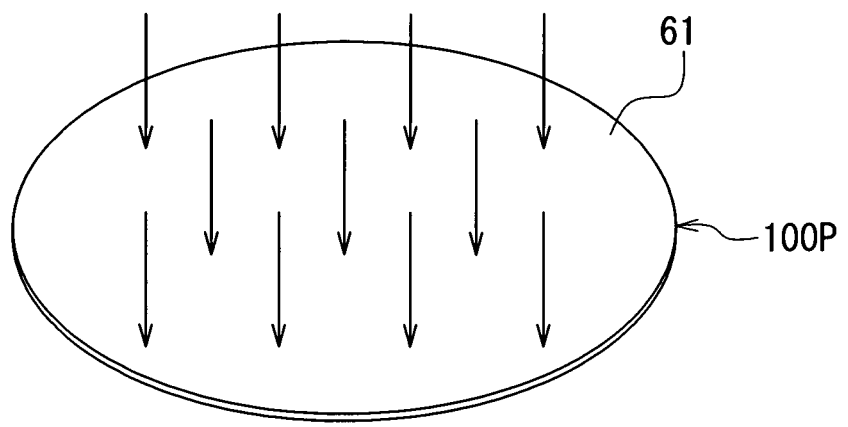
FIG. 13 is an explanatory diagram showing a heating step in the method of manufacturing a plurality of thermally-assisted magnetic recording heads according to the third embodiment of the invention.

FIG. 12A to FIG. 12C and FIG. 13 show the heating step of irradiating the anti-reflection film with the heating light. FIG. 12A to FIG. 12C each show a portion of a stack of layers formed in the process of fabricating the substructure, the portion corresponding to a single pre-head portion. FIG. 12A and FIG. 12B are cross-sectional views each showing the portion of the stack. FIG. 12A shows a cross section that intersects the front end face of the main pole 26 and is perpendicular to the medium-facing surface 40 and the top surface 1a of the substrate 1. FIG. 12B shows a cross section of the stack taken at the position at which the medium-facing surface 40 is to be formed. FIG. 12C is a plan view showing the portion of the stack. In FIG. 12A to FIG. 12C, the symbol "ABS" indicates the position in the stack at which the medium-facing surface 40 is to be formed. FIG. 13 is an explanatory diagram showing the heating step.

In the present embodiment, an anti-reflection film 61 is formed on the initial film 501 between the step of forming the initial film 501 and the heating step. The anti-reflection film 61 is formed of, for example, C, SiC, FeO, or Si. By way of example, the reflectivity of Si is shown in FIG. 10.

In the heating step, the anti-reflection film 61 is irradiated with the heating light. In FIG. 12A, FIG. 12B, and FIG. 13, the solid arrows indicate the heating light. Part of the heating light applied to the anti-reflection film 61 is absorbed by the anti-reflection film 61, so that heat is generated in the anti-reflection film 61. This heat is transferred to the initial film 501. The other part of the heating light applied to the anti-reflection film 61 passes through the anti-reflection film 61 and reaches the initial film 501, so that heat is generated in the initial film 501. The initial film 501 is heated by these effects.

Reference is now made to FIG. 10 to describe an example of combinations of the material of the initial film 501, the material of the anti-reflection film 61, and the wavelength of the heating light. As can be seen from FIG. 10, where Au, Ag, or Al is used as the material of the initial film 501, such a wavelength region for the heating light is available that the reflectivity of Si for the heating light is lower than that of the initial film 501. Thus, where Au, Ag, or Al is used as the material of the initial film 501, such a wavelength of the heating light that the reflectivity of Si for the heating light is lower than that of the initial film 501 can be selected, and Si can be employed as the material of the anti-reflection film 61.

In the present embodiment, the anti-reflection film 61 may or may not be removed after the heating step.

The present embodiment allows the plurality of pre-plasmon-generator portions 501 of the initial film 501 to be simultaneously heated with the heating light. This makes it possible to reduce the time required for the heating step and consequently improve the productivity of the thermally-assisted magnetic recording heads when compared with the first and second embodiments.

The remainder of configuration, function and effects of the present embodiment are similar to those of the first embodiment.

The present invention is not limited to the foregoing embodiments, and various modifications may be made thereto. For example, in the present invention, the initial film before being heated may be a film that is patterned to have at least one portion made up of the pre-plasmon-generator portion 501 and the portion to be removed 501R shown in FIG. 4C. In this case, the initial film before being heated may be patterned in the same manner as in the step shown in FIG. 6A to FIG. 6C. Alternatively, the initial film before being heated may be formed by embedding the material of the initial film in one or more accommodation parts formed in advance in a dielectric layer. The patterned initial film is heated with the heating light in the same manner as the heating step of the foregoing embodiments.

Further, as far as the requirements of the appended claims are met, the shapes and locations of the core 20, the plasmon generator 50 and the main pole 26 are not limited to the examples illustrated in the foregoing embodiments, and can be chosen as desired.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A method of manufacturing a plasmon generator, the plasmon generator having a plasmon-exciting part configured to excite a surface plasmon, and a front end face that generates near-field light based on the surface plasmon, the method comprising the steps of:
    forming an initial film made of a metal polycrystal and including a pre-plasmon-generator portion that later becomes the plasmon generator;
    heating the initial film with heating light so that a plurality of crystal grains constituting the metal polycrystal grow at least in the pre-plasmon-generator portion;
    stopping the heating of the initial film; and
    forming the plasmon generator by processing the initial film after the step of stopping the heating,
    wherein the step of forming the plasmon generator includes the step of providing the pre-plasmon-generator portion with the front end face.

2. The method according to claim 1, wherein the initial film is irradiated with the heating light in the step of heating the initial film.

3. The method according to claim 1, further comprising the step of forming an anti-reflection film on the initial film between the step of forming the initial film and the step of heating the initial film, the anti-reflection film being lower in reflectivity for the heating light than the initial film,
    wherein the anti-reflection film is irradiated with the heating light in the step of heating the initial film.

4. A method of manufacturing a plurality of thermally-assisted magnetic recording heads, each of the plurality of thermally-assisted magnetic recording heads including a substrate having a top surface, a write head section disposed above the top surface of the substrate, a read head section disposed between the top surface of the substrate and the write head section, and a medium-facing surface facing a recording medium, wherein
    the write head section includes: a main pole that produces a write magnetic field for writing data on the recording medium; a waveguide including a core and a cladding, the core allowing light to propagate through; and a plasmon generator,
    the plasmon generator having a plasmon-exciting part configured to excite a surface plasmon based on the light propagating through the core, and a front end face located in the medium-facing surface and generating near-field light based on the surface plasmon,
    the method comprising the steps of:
    fabricating a substructure including an array of a plurality of pre-head portions, the plurality of pre-head portions becoming the plurality of thermally-assisted magnetic recording heads later; and
    forming the plurality of thermally-assisted magnetic recording heads by cutting the substructure to separate the plurality of pre-head portions from each other and by forming the medium-facing surface for each of the plurality of pre-head portions, wherein
    the step of fabricating the substructure includes the steps of:
        forming an initial film made of a metal polycrystal and including a plurality of pre-plasmon-generator portions that later become a plurality of plasmon generators corresponding to the plurality of thermally-assisted magnetic recording heads;
        heating the initial film with heating light so that a plurality of crystal grains constituting the metal polycrystal grow at least in the plurality of pre-plasmon-generator portions; and
        stopping the heating of the initial film, and
    in the step of forming the plurality of thermally-assisted magnetic recording heads, each of the plurality of pre-plasmon-generator portions is provided with the front end face and the plurality of pre-plasmon-generator portions thereby become the plurality of plasmon generators.

5. The method according to claim 4, wherein the initial film is irradiated with the heating light in the step of heating the initial film.

6. The method according to claim 4, wherein
    the step of fabricating the substructure further includes the step of forming an anti-reflection film on the initial film between the step of forming the initial film and the step of heating the initial film, the anti-reflection film being lower in reflectivity for the heating light than the initial film, and
    the anti-reflection film is irradiated with the heating light in the step of heating the initial film.

7. The method according to claim 4, wherein the plurality of pre-plasmon-generator portions are heated one by one in the step of heating the initial film.

8. The method according to claim 4, wherein the plurality of pre-plasmon-generator portions are heated simultaneously in the step of heating the initial film.

9. The method according to claim 4, wherein
the core has an evanescent-light-generating surface that generates evanescent light based on the light propagating through the core,
the cladding has an interposition part interposed between the evanescent-light-generating surface and the plasmon exciting part, and
the surface plasmon is excited on the plasmon-exciting part through coupling with the evanescent light generated from the evanescent-light-generating surface.

* * * * *